(12) United States Patent  
Chun et al.

(10) Patent No.: US 9,313,408 B2  
(45) Date of Patent: Apr. 12, 2016

(54) MOBILE DEVICE FOR CAPTURING IMAGES AND CONTROL METHOD THEREOF

(71) Applicant: LG ELECTRONICS INC., Seoul (KR)

(72) Inventors: Sinae Chun, Seoul (KR); Jongho Kim, Seoul (KR); Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 14/176,779

(22) Filed: Feb. 10, 2014

(65) Prior Publication Data

US 2015/0189161 A1     Jul. 2, 2015

(30) Foreign Application Priority Data

Dec. 26, 2013   (KR) .......................... 10-2013-0164043

(51) Int. Cl.
*H04N 5/222* (2006.01)
*H04N 5/232* (2006.01)
*H04N 1/00* (2006.01)

(52) U.S. Cl.
CPC ....... *H04N 5/23293* (2013.01); *H04N 1/00453* (2013.01); *H04N 1/00458* (2013.01); *H04N 1/00461* (2013.01); *H04N 1/00469* (2013.01); *H04N 5/23216* (2013.01)

(58) Field of Classification Search
CPC .......... H04N 5/23293; H04N 5/23216; H04N 1/00458; H04N 1/21

USPC .......................................... 348/333.01–333.08
See application file for complete search history.

(56) References Cited

U.S. PATENT DOCUMENTS

| | | | |
|---|---|---|---|
| 8,593,555 | B1 | 11/2013 | Chun et al. |
| 2008/0119235 | A1 | 5/2008 | Nielsen et al. |
| 2009/0093275 | A1 | 4/2009 | Oh et al. |
| 2012/0297298 | A1 | 11/2012 | Dovey et al. |
| 2014/0282745 | A1* | 9/2014 | Chipman et al. ................ 725/61 |

FOREIGN PATENT DOCUMENTS

| | | |
|---|---|---|
| EP | 2207086 A2 | 7/2010 |
| WO | WO 2013/047944 A1 | 4/2013 |

* cited by examiner

*Primary Examiner* — Yogesh Aggarwal
(74) *Attorney, Agent, or Firm* — Birch, Stewart, Kolasch & Birch, LLP

(57) ABSTRACT

Discussed is a mobile device that displays an image in consideration of a relationship among a plurality of captured images in a window mode. The mobile device includes a storage unit configure to store an image, a display unit configured to display the image, a sensor unit configured to detect a touch input to the display unit, and a controller configured to display an image in any one selected from between a navigation mode to display a plurality of thumbnail images and a window mode to display at least one image selected from among the plurality of thumbnail image, wherein the controller captures a first image and a second image having an upper and lower position relationship or a left and right position relationship to the first image from a first source, and captures a third image from a second source.

19 Claims, 18 Drawing Sheets

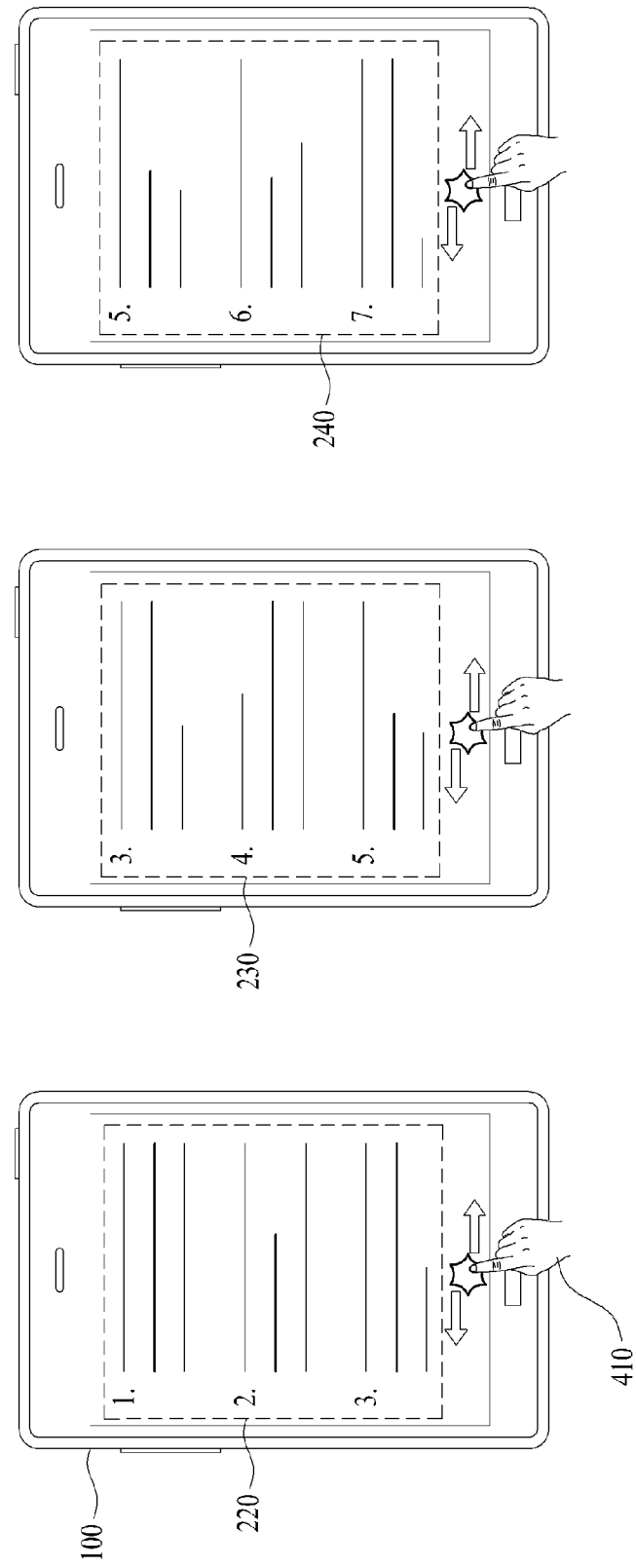

FIG. 12B
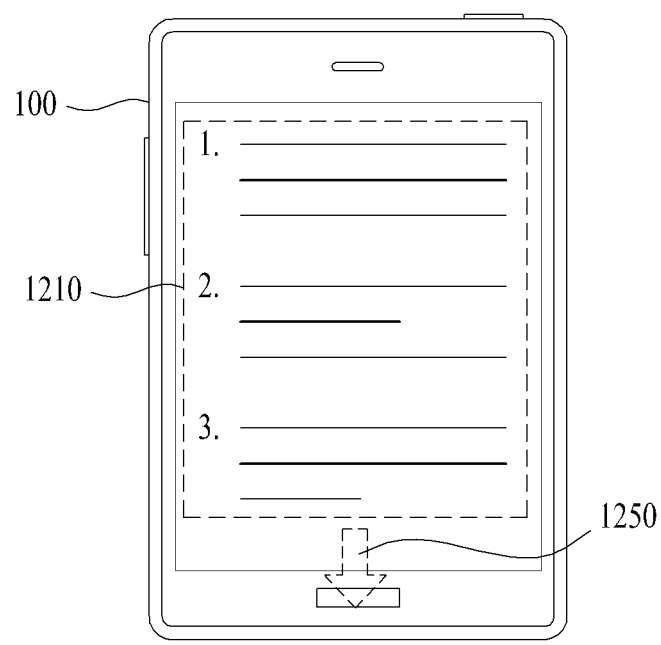
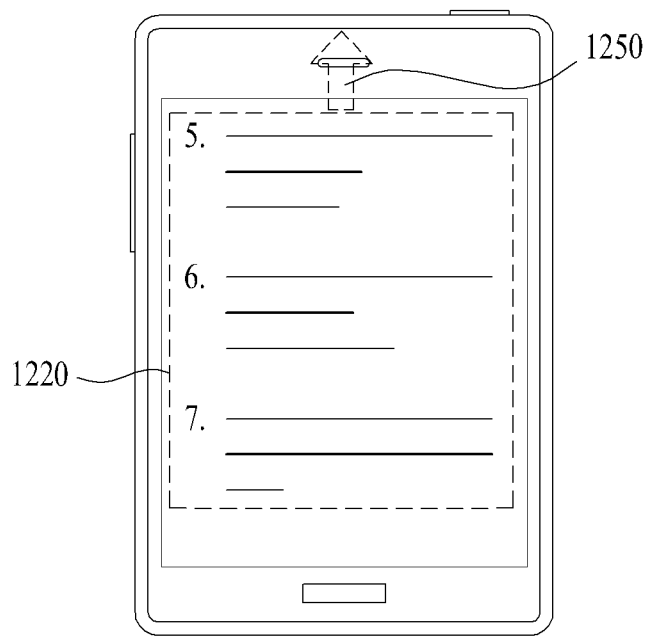

FIG. 12C
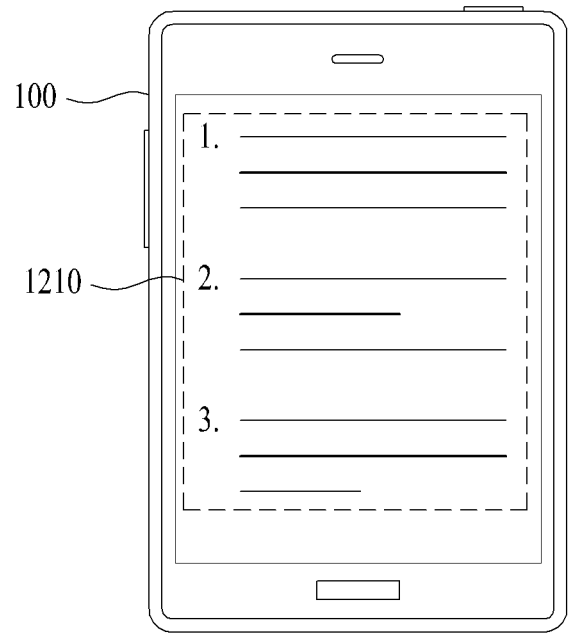
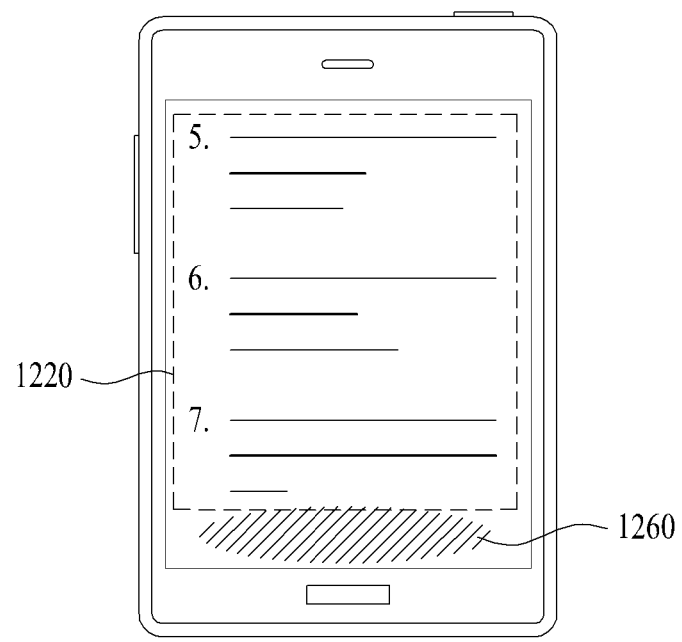

MOBILE DEVICE FOR CAPTURING IMAGES AND CONTROL METHOD THEREOF

This application claims the benefit of Korean Patent Application No. 10-2013-0164043, filed on Dec. 26, 2013, which is hereby incorporated by reference as if fully set forth herein.

BACKGROUND OF THE INVENTION

1. Field of the Invention

The disclosure relates to a mobile device and, more particularly, to a mobile device that displays an image in consideration of a relationship among a plurality of captured images in a window mode.

2. Discussion of the Related Art

A mobile device may capture an image and display the captured image. Due to miniaturization of the mobile device, the mobile device has a limited display area with the result that the mobile device displays only a portion of visual information. That is, the mobile device may display a partial area and may not display the other area. In a case in which the mobile device capture visual information, the mobile device may store only visual information of an area displayed by the mobile device as an image. In addition, the mobile device may display an undisplayed area through scroll. At this time, the mobile device may divide the visual information into a plurality of areas and capture and store the divided areas of the visual information. The stored images are in an upper and lower position relationship or a left and right position relationship in the visual information.

In a case in which the mobile device displays an image, the mobile device sequentially switches between images in sequence in which the images are stored in a horizontal direction or in sequence in which the images are arranged based on a predetermined criterion and displays a switched image. However, it is necessary to provide a method of sequentially switching among and displaying a plurality of images captured and stored from a piece of visual information while having an upper and lower position relationship in a vertical direction based on the upper and lower position relationship.

SUMMARY OF THE INVENTION

Accordingly, the disclosure is directed to a mobile device for capturing images and a control method thereof that substantially obviate one or more problems due to limitations and disadvantages of the related art.

In particular, an object of the disclosure is to provide a method of differently setting an image switching gesture based on a position relationship of images captured and stored from the same source in a case in which a mobile device displays an image.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a mobile device includes a storage unit configure to store an image, a display unit configured to display the image, a sensor unit configured to detect a touch input to the display unit, and a controller configured to display an image in any one selected from between a navigation mode to display a plurality of thumbnail images and a window mode to display at least one image selected from among the plurality of thumbnail image, wherein the controller captures a first image and a second image having an upper and lower position relationship or a left and right position relationship to the first image from a first source, captures a third image from a second source, and in a case in which the controller displays the first image of the first source in the window mode, if the controller detects a first gesture in a first direction, switches from the first image of the first source to the third image of the second source and displays the third image of the second source, and, if the controller detects a second gesture in a second direction, switches from the first image of the first source to the second image of the first source and displays the second image of the first source.

It is to be understood that both the foregoing general description and the following detailed description of the disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 4 is a view showing a method of the mobile device 100 switching between and displaying a plurality of image captured from the same source in accordance with an embodiment of the disclosure;

FIGS. 12A to 12C are views showing a method of the mobile device 100 displaying an indicator to guide a user's gesture in accordance with an embodiment of the disclosure.

DETAILED DESCRIPTION OF THE INVENTION

Reference will now be made in detail to the preferred embodiments of the disclosure, examples of which are illustrated in the accompanying drawings. However, it should be understood that the scope of the disclosure is not limited to or restricted by the embodiments.

Although the terms used in the following description are selected, as much as possible, from general terms that are widely used at present while taking into consideration the functions of the disclosure, these terms may be replaced by other terms based on intensions of those skilled in the art, customs, emergence of new technologies, or the like. In addition, in a particular case, terms that are arbitrarily selected by the applicant may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the disclosure, a mobile device 100 may be a smartphone, a smart pad, a tablet computer, a laptop computer, or a personal digital assistant (PDA). In addition, the mobile device 100 may include a head mounted display. For the head mounted display, a user may perform a capture operation, which will hereinafter be described, by controlling an object displayed as augmented reality instead of controlling a display unit. Furthermore, for the head mounted display, the user may perform a capture operation, which will hereinafter be described, by controlling a projected object instead of controlling a display unit 120.

Figure 1:
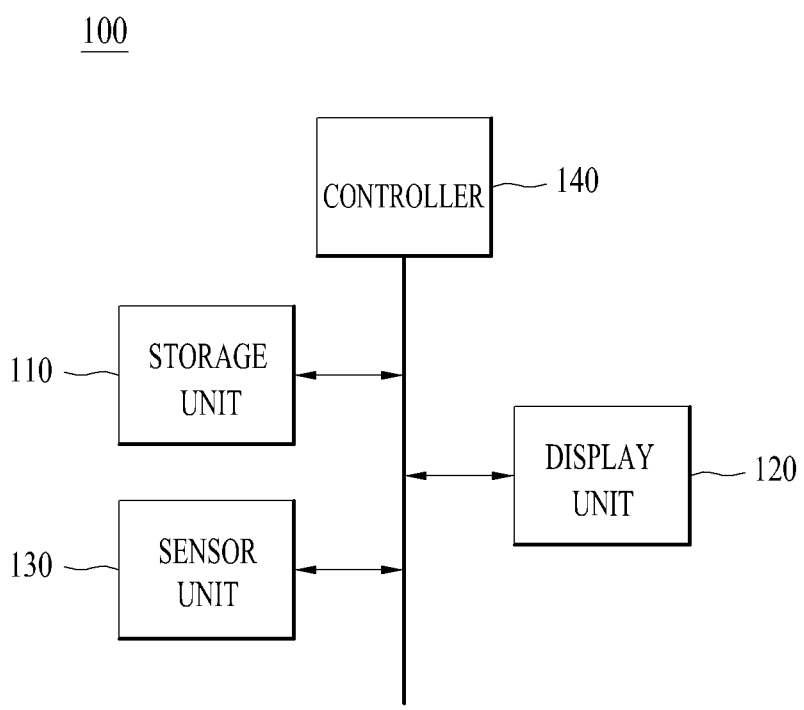
FIG. 1 is a block diagram of a mobile device 100 according to an embodiment of the disclosure.

FIG. 1 is a block diagram of a mobile device 100 according to an embodiment of the disclosure. The mobile device 100 may include a storage unit 110, a display unit 120, a sensor unit 130, and a controller 140.

The storage unit 110 may store various types of digital data, such as video, audio, images, and applications. According to the disclosure, the storage unit 110 may store captured images. For example, the storage unit 110 may store a program for controlling the controller 140. In addition, the storage unit 110 may function to temporarily store input/output data. The storage unit 110 may include various types of digital data storage spaces, such as a flash memory, a random access memory (RAM), and a solid state drive (SSD).

The display unit 120 may display visual information. In this case, the display unit 120 may display only an area of the visual information limited to the size of the display unit 120. According to the disclosure, the entirety of visual information displayed by the mobile device 100 is referred to as a source. More specifically, visual information including both an area of the visual information which may be displayed on the display unit 120 and an area of the visual information which may not be displayed on the display unit 120 is referred to as a source. For example, the source may be a webpage or content executed by the mobile device 100. In addition, the webpage or the content may be identified by information regarding one source address. The source address may be a unique address for URL address or network access. However, the disclosure is not limited to the above embodiment of the address. Information regarding any address having the same source may be the above source address.

In addition, visual information which may not be entirely displayed on the display unit 120 and further display an undisplayed area through scroll may be a source in the disclosure. More specifically, visual information is referred to as a source so long as the mobile device 100 may capture and store a partial area of the visual information displayed on the display unit 120, scroll, and capture and store another area of the visual information displayed on the display unit 120. In another example, even in a case in which the entirety of visual information is less in size than the display unit 120, the visual information may be referred to as a source so long as the mobile device 100 may divide, capture, and store the visual information.

According to embodiments, the display unit 120 may include at least one selected from among an organic light emitting diode (OLED), a liquid crystal display (LCD), electronic ink, a head mounted display (HMD), and a flexibly display.

The sensor unit 130 may detect a user's control input. At this time, the sensor unit 130 may detect a control input to capture displayed visual information. In addition, the sensor unit 130 may detect a control input to switch between captured and stored images. Furthermore, the sensor unit 130 may detect a control input for a user command. However, the disclosure is not limited to the above embodiment.

In an embodiment, the mobile device 100 may detect a touch input as a control input using a touch sensor. Alternatively, the mobile device 100 may detect a tilt of the mobile device 100 as a control input using a gyro sensor or an acceleration sensor. Alternatively, the mobile device 100 may detect a gesture input as a control input using a proximity sensor. Alternatively, the mobile device 100 may detect a voice input as a control input using a voice recognition sensor. In addition, the mobile device 100 may detect a control input through an input device. In this case, the input device may include a mouse, a keyboard, or a remote controller. That is, the mobile device 100 of the disclosure may capture displayed visual information or detect a user's control input for switching between captured and stored images using the sensing units as described above. In the disclosure, at least one of the above sensing units is referred to as the sensor unit 130.

The above sensors may be included in the mobile device 100 as individual elements or at least one integrated elements. In addition, the sensor unit 130 is not limited to the above embodiments of the sensors. Any sensor may be used so long as the sensor can detect a control input for image switching.

In addition, the sensor unit 130 may transmit the detected user's control input to the controller 140. At this time, the control input may include information regarding a position of the display unit 130 at which the control input has been detected. In this case, the display unit 120 and the sensor unit 130 may be integrated into a touch sensitive display unit according to embodiments. In this case, the touch sensitive display unit may include an electrostatic touch panel or a resistive touch panel.

The controller 140 may control the display unit 120 using the control input received from the sensor unit 130 and capture and store the displayed visual information as an image. More specifically, the controller 140 may capture and store only visual information of the source displayed on the display unit 120 as an image. For example, the controller 140 may select only a partial area of the visual information displayed on the display unit 120 and capture and store the selected area as an image.

At this time, the sensor unit 130 may detect a control input for scroll and transmit the detected control input to the controller 140. When the controller 140 receives the control input, the controller 140 may further display an undisplayed area of the source. In this case, the controller 140 may capture and store displayed visual information as an image. According to the disclosure, the controller 140 may store the captured and stored image in the storage unit 110. In this case, the controller 140 may store images in the storage unit 110 in captured order. Alternatively, the controller 140 may separate and store the captured images in folders set by the user or the controller 140. According to the disclosure, for example, the controller 140 may store images captured from the same source in an integrated state, which will hereinafter be described.

In addition, the controller 140 may switch between images displayed on the display unit 120 according to the control input received from the sensor unit 130. At this time, the controller 140 may detect the control input as a gesture. More specifically, the gesture means that the above control input moves from the position at which the control input has been detected in a predetermined direction. At this time, the controller 140 may differently set an image switching method according to the direction in which the gesture moves. According to the disclosure, for example, the gesture may be a control input considering a movement direction of an input device. In addition, the gesture may be a control input considering a movement direction of a voice recognition sensor. However, the disclosure is not limited to the above embodiment. A control input which may differently set the image switching method according to the movement direction may be the above gesture.

Figure 2:
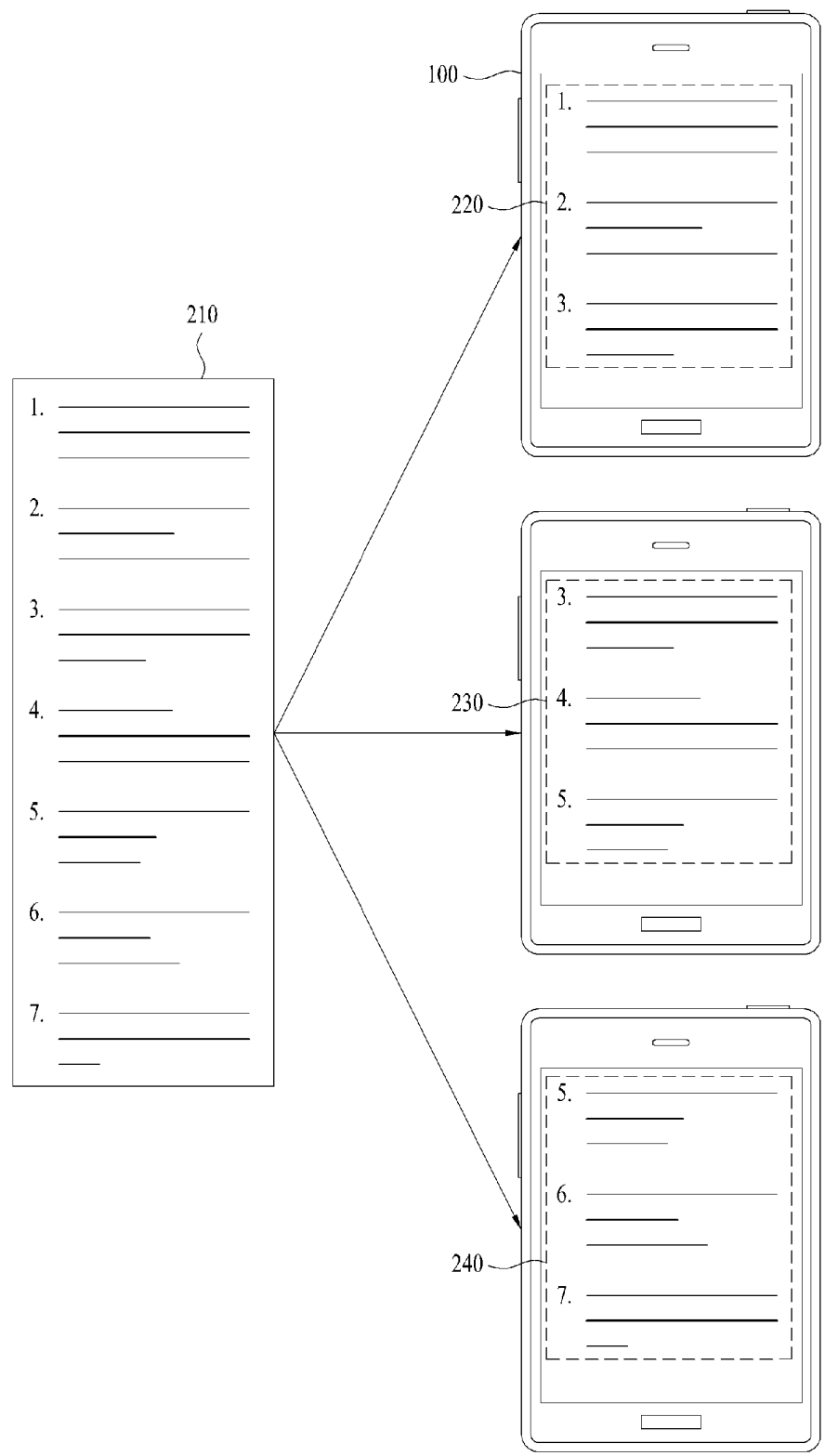
FIG. 2 is a view showing a method of a controller 140 capturing a plurality of images from the same source in accordance with an embodiment of the disclosure.

FIG. 2 is a view showing a method of the controller 140 capturing a plurality of images from the same source in accordance with an embodiment of the disclosure. In this case, a source including visual information of first to seventh paragraphs may be a first source 210. if the mobile device 100 displays visual information of the first source 210, a displayed area of the visual information may be limited based on the size of the display unit 120. That is, the mobile device 100 may display only an area of the visual information of the first source 210 equivalent to the size of the display unit 120. According to an embodiment, the mobile device 100 may display only the information of the first to third paragraphs of the visual information of the first source 210. At this time, if the controller 140 detects a control input for scroll, the mobile device 100 may scroll the visual information of the first source 210 to display the information of the third to fifth paragraphs.

In addition, the controller 140 may capture and store a displayed area of the visual information of the first source 210 as an image. According to an embodiment, the controller 140 may capture and store the displayed information of the first to third paragraphs of the visual information of the first source 210 as a first image 220. In this case, the first image 220 may be an image which has been first captured and stored from the first source 210. In addition, the first image 220 of the first source 210 may be an image which has been captured and stored at the uppermost or the leftmost position of the first source 210.

If the controller 140 detects a control input for scroll, the mobile device 100 may scroll the visual information of the first source 210 to display the information of the third to fifth paragraphs. At this time, the controller 140 may capture and store the displayed information of the third to fifth paragraphs as a second image 230. In addition, the controller 140 may capture and store the information of the fifth to seventh paragraphs as a third image 240 in the same manner as in the above.

At this time, the first image 220, the second image 230, and the third image 240 may be in an upper and lower position relationship. More specifically, if the controller 140 detects a control input for vertical scroll according to a position relationship in the first source 210, the upper and lower position relationship may be a relationship among the images 220, 230, and 240 displayed by the mobile device 100. That is, if the mobile device 100 displays an area of the visual information limited to the size of the display unit 120, the controller 140 may detect vertical scroll as a control input to display an undisplayed area of the visual information in the upper and lower position relationship.

In addition, according to an embodiment of the disclosure, the first image 220, the second image 230, and the third image 240 may be in a left and right position relationship in the first source. More specifically, if the controller 140 detects a control input for horizontal scroll according to a position relationship in the first source 210, the left and right position relationship may be a relationship among the images 220, 230, and 240 displayed by the mobile device 100. That is, if the mobile device 100 displays an area of the visual information limited to the size of the display unit 120, the controller 140 may detect horizontal scroll as a control input to display an undisplayed area of the visual information in the left and right position relationship.

In addition, according to the disclosure, the images 220, 230, and 240 may include an overlap area, which will be described with reference to FIG. 11.

In addition, according to an embodiment, the controller 140 may select, capture, and store an area smaller than the size of the display unit 120 as an image. More specifically, the controller 140 may not capture the first to third paragraphs but may capture and store the first and second paragraph as the first image 220. In addition, the controller 140 may capture and store only the second and third paragraphs as the second image 230.

In addition, the controller 140 may differently set the sizes of the captured and stored images 220, 230, and 240 based on the size of the display unit 120. In addition, the controller 140 may change the size and resolution of each image and capture and store each image the size and resolution of which have been changed.

Figure 3:
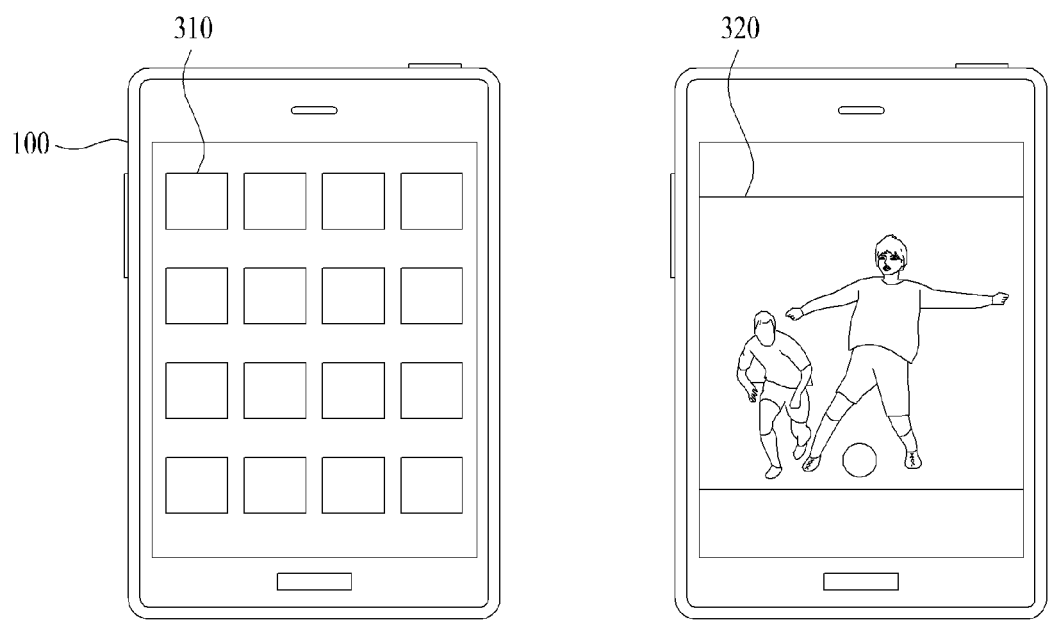
FIG. 3 is a view showing a method of the mobile device 100 displaying images in accordance with an embodiment of the disclosure.

FIG. 3 is a view showing a method of the mobile device 100 displaying images in accordance with an embodiment of the disclosure. The mobile device 100 may display images in a navigation mode to display captured and stored images as a plurality of thumbnail images 310. In addition, the mobile device 100 may display images in a window mode to select and display at least one of the thumbnail images 310. The thumbnail images 310 are images which are displayed in a state in which the sizes of the images are reduced to view the entire layout of the images. In addition, the navigation mode is a mode to display the thumbnail images 310 such that a user can search for and select a desired one of the thumbnail images 310. According to an embodiment, the mobile device 100 may reduce the sizes of the thumbnail images 310 to the same size and display the thumbnail images 310 having the reduced size. In addition, if the mobile device 100 cannot display all of the thumbnail images 310 on the display unit 120, the controller 140 may detect a control input for scrolling the thumbnail images 310 to search for and select a desired one of the thumbnail images 310 in the navigation mode.

In addition, the controller 140 may display images in the window mode. The window mode is a mode to select and display at least one of the thumbnail images 310 as a window image 320. That is, the mobile device 100 may display a large image through the window mode.

As an example, the mobile device 100 may display the window image 320 as a full screen on the display unit 120. That is, the mobile device 100 may display the window image 320 in a state in which the window image 320 has the size of the display unit 120. In addition, according to an example, the mobile device 100 may display the window image 320 on a partial area of the display unit 120. At this time, the controller 140 may adjust the ratio, size, or resolution of the window image 320.

In addition, according to an example, the mobile device 100 may display a plurality of images as the window image 320. More specifically, the controller 140 may select a plurality of images from the thumbnail images 310 and simultaneously display the selected images. As an example, the controller 140 may horizontally divide a display area into two equal parts to display two images captured from the same source in an upper and lower position relationship.

However, the disclosure is not limited to above embodiment. The controller 140 may display a plurality of images having various sizes and forms as the window image 320.

FIG. 4 is a view showing a method of the mobile device 100 switching between and displaying a plurality of image captured from the same source in accordance with an embodiment of the disclosure. The controller 140 may display the images in the above window mode. At this time, the sensor unit 130 may detect a control input for a gesture of a user 410 and transmit the detected control input to the controller 140. The controller 140 may switch images using the received control input. At this time, the controller 140 may switch from the current image to the next image and then display the switched image. Alternatively, the controller 140 may switch from the current image to the previous image and then display the switched image. More specifically, if the controller 140 detects current position information for the control input and detects a gesture of moving from the current position to the left or the right, the controller 140 may switch between images. At this time, the gesture may be a slide gesture. In addition, a gesture of moving a predetermined direction may be the gesture of the disclosure.

As an example, the controller 140 may switch among and display the first image 220, the second image 230, and the third image 240 captured from the same first source 210 according to the upper and lower position relationship. if the controller 140 may display the first image 220, the controller 140 may detect a gesture of moving from the current control input position to the left (hereinafter, referred to as a left horizontal slide gesture) to display the second image 230. In addition, if the controller 140 may display the second image 230, the controller 140 may detect a left slide gesture to switch to and display the third image 240. In addition, the controller 140 may detect a gesture of moving from the current control input position to the right (hereinafter, referred to as a right slide gesture) to switch to and display the first image 220.

However, the first image 220, the second image 230, and the third image 240 may be in the upper and lower position relationship in the first source 210. Consequently, it is necessary for the mobile device 100 to differently set image switching gestures in consideration of the upper and lower position relationship among the images 220, 230, and 240.

Figure 5A:
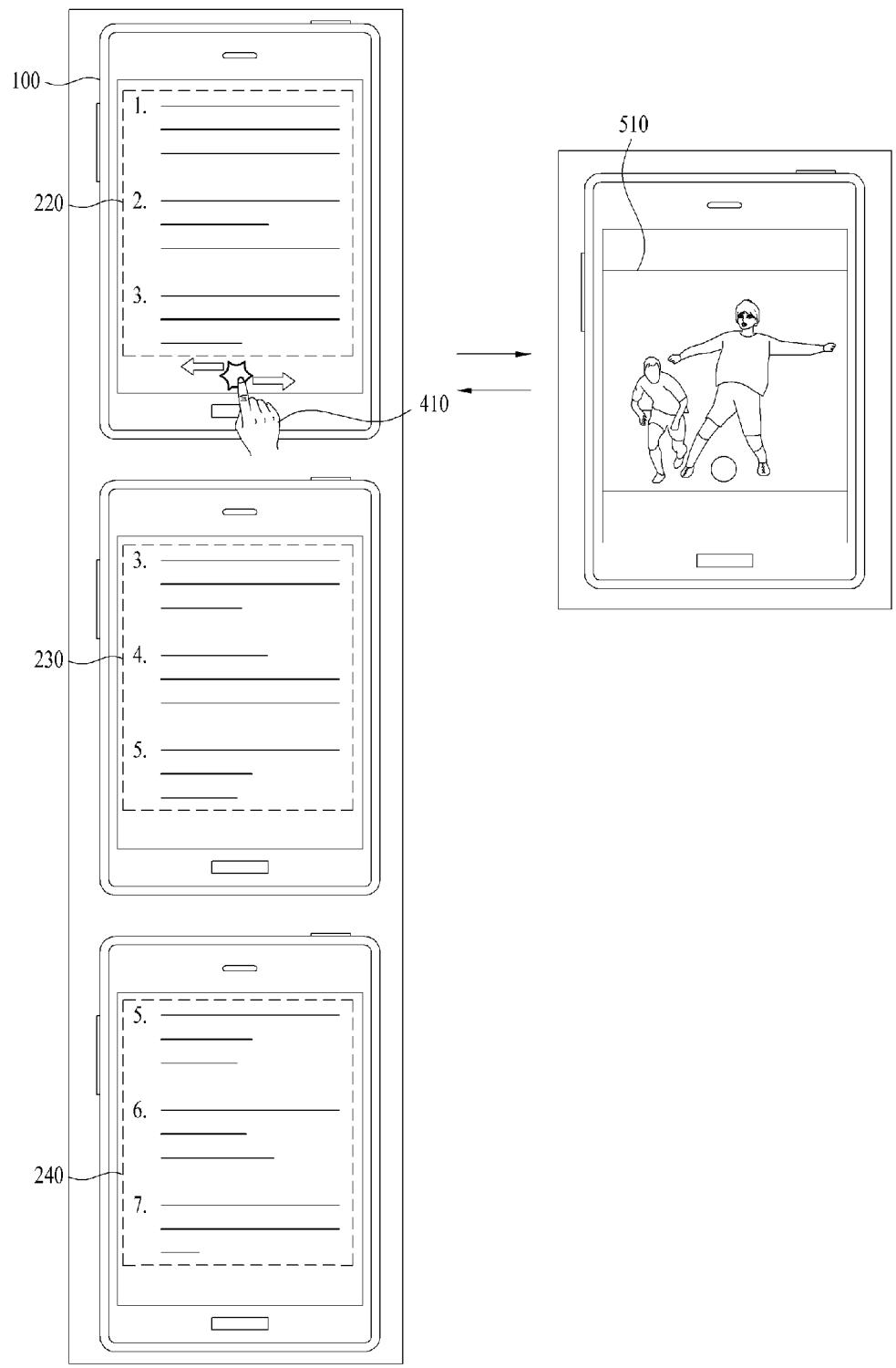
FIGS. 5A and 5B are views showing a method of the mobile device 100 switching between and displaying a plurality of image captured from the same source in accordance with an embodiment of the disclosure.
Figure 5B:
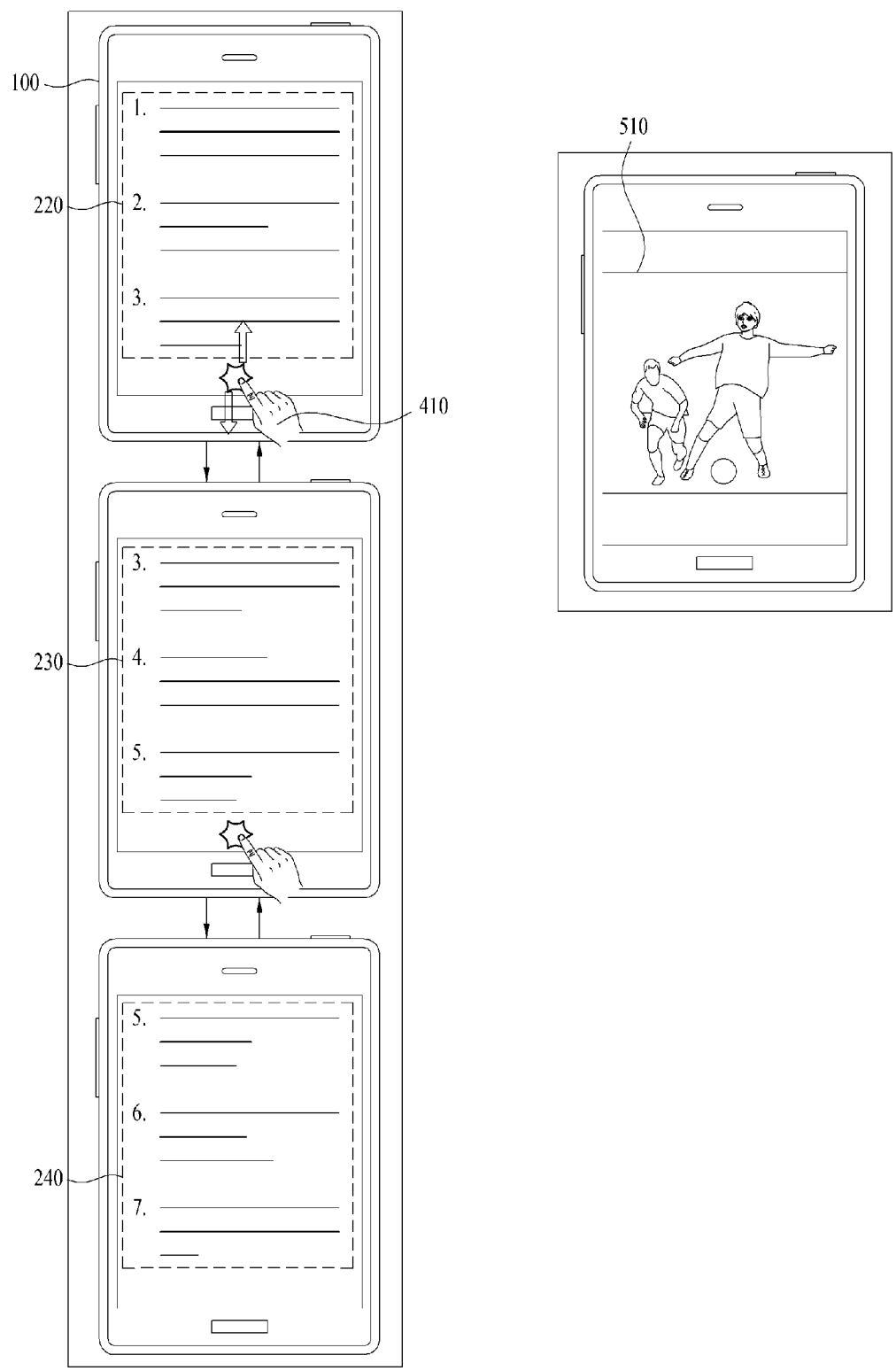

FIGS. 5A and 5B are views showing a method of the mobile device 100 switching between and displaying a plurality of image captured from the same source in accordance with an embodiment of the disclosure. According to the disclosure, as previously described, the controller 140 may capture and store a first image 220, a second image 230, and a third image 240 from a first source 210 as images. In addition, the controller and capture and store a fourth image 510 from a second source as an image. At this time, the controller 140 may separately store the images 220, 230, and 240 captured from the first source and the fourth image 510 captured from the second source. According to an embodiment, the controller 140 may create a folder per source and store images in the corresponding folders. In addition, the controller 140 may store images in a state in which the images are coupled or linked per source to indicate the same source without creation of folders.

if the controller 140 displays the first image 220 of the first source 210 in the window mode, the controller 130 may detect a first gesture in a first direction to switch from the first image 220 of the first source 210 to the fourth image 510 of the second source and display the switched fourth image 510. In addition, if the controller 140 displays the first image 220 of the first source 210 in the window mode, the controller 130 may detect a second gesture in a second direction to switch from the first image 220 of the first source 210 to the second image 230 of the first source 210 and display the switched second image 230.

More specifically, the controller 140 may use the first gesture in the first direction as a gesture for image switching between sources. In addition, the controller 140 may use the second gesture in the second direction as a gesture for image switching in the same source. At this time, as an example, the controller 140 may set the first gesture in the first direction as a horizontal slide gesture. In addition, if the images of the first source 210 are in the upper and lower position relationship, the controller 140 may set the second gesture in the second direction as a vertical slide gesture. As a result, the controller 140 may differentially perform a method of switching between images captured from different sources and a method of switching between images captured from the same source.

At this time, the controller 140 may detect that a control input moves downward from the position of the control input (hereinafter, referred to as a downward vertical slide gesture). In addition, the controller 140 may detect that a control input moves upward from the position of the control input (hereinafter, referred to as an upward vertical slide gesture).

In addition, as an example, the controller 140 may set a gesture moving in a predetermined direction as the first gesture or the second gesture as described above. In addition, the controller 140 may differently set the first gesture or the second gesture according to embodiments.

According to an embodiment, referring to FIG. 5A, the images 220, 230, and 240 captured from the first source 210 may be in the upper and lower position relationship. At this time, as previously described, in a case in which the controller 140 detects a control input for vertical scroll, a relationship among images displayed by the mobile device 100 may be the upper and lower position relationship.

At this time, if the mobile device 100 displays the first image 220 of the first source 210, the controller 140 may switch to and display the fourth image 510 of the second source using the horizontal slide gesture. In addition, in a case in which the mobile device 100 displays the second image 230 and the third image 240 of the first source 210, the controller 140 may switch to and display the fourth image 510 of the second source using the horizontal slide gesture. That is, the controller 140 may set the horizontal slide gesture as a gesture of switching between images captured from different sources.

Referring to FIG. 5B, if the mobile device 100 displays the first image 220 of the first source 210, the controller 140 may switch to and display the second image 230 of the first source 210 using the vertical slide gesture. In addition, in a case in which the mobile device 100 displays the second image 230 of the first source 210, the controller 140 may switch to and display the third image 240 of the first source 210 using the vertical slide gesture. In connection with this case, in FIG. 4, the controller 140 may switch among the images 220, 230, and 240 captured from the first source 210 according to the upper and lower position relationship using the horizontal slide gesture. As previously described, however, the images 220, 230, and 240 captured from the first source 210 may be in the upper and lower position relationship. Consequently, the controller 140 may switch among and display the images 220, 230, and 240 captured in the upper and lower position relationship using the vertical slide gesture. As a result, the controller 140 may switch among the images in the same position relationship as the position relationship in the first source 210.

In addition, the images 220, 230, and 240 captured from the first source 210 according to an embodiment of the disclosure may be in the left and right position relationship. At this time, as previously described, in a case in which the controller 140 detects a control input for horizontal scroll, the relationship among the images displayed by the mobile device 100 may be the left and right position relationship.

At this time, if the mobile device 100 displays the first image 220 of the first source 210 in the window mode, the controller 140 may detect the first gesture in the first direction to switch from the first image 220 of the first source 210 to the fourth image 510 of the second source and display the switched fourth image 510. In addition, if the mobile device 100 displays the first image 220 of the first source 210 in the window mode, the controller 140 may detect the second gesture in the second direction to switch from the first image 220 of the first source 210 to the second image 230 of the first source 210 and display the switched second image 230.

At this time, the controller 140 may switch the images in the left and right position relationship unlike the images in the upper and lower position relationship.

At this time, as an example, the controller 140 may set the first gesture in the first direction as the horizontal slide gesture. In addition, if the images of the first source 210 are in the left and right position relationship, the controller 140 may also set the second gesture in the second direction as the horizontal slide gesture. That is, in a case in which the controller 140 switches among the images in the left and right position relationship, the controller 140 may set the first direction and the second direction as the same directions and set the first gesture and the second gesture as the same gestures. In order to differentiate between the same gestures in the same directions, therefore, the controller 140 may detect threshold speed of the gestures. As an example, the controller 140 may detect whether the horizontal slide gesture is equal to or greater than the threshold speed. According to the disclosure, the controller 140 may determine the speed of the gesture according to a control input received through the sensor unit 130. At this time, if the speed of the slide gesture detected by the controller 140 is equal to or greater than the threshold speed, the controller 140 may detect the gesture as a gesture of image switching between the sources. That is, if the mobile device 100 displays the first image of the first source 210, the controller 140 may detect the horizontal slide gesture equal to or greater than the threshold speed to display the fourth image 510 of the second source.

On the other hand, if the speed of the slide gesture detected by the controller 140 is less than the threshold speed, the controller 140 may detect the gesture as a gesture of image switching in the same source. That is, if the mobile device 100 displays the first image of the first source 210, the controller 140 may detect the horizontal slide gesture less than the threshold speed to display the second image 230 of the first source 210.

At this time, according to a preferred embodiment of the disclosure, the threshold speed is critical speed, based on which the controller 140 may determine whether the gesture is a gesture of differentiating between the image switching methods. The controller 140 may set the critical speed to within a predetermined error range and determine whether the gesture is detected within the error range.

In addition, according to an embodiment, if the mobile device 100 displays the first image of the first source 210, the controller 140 may detect the horizontal slide gesture equal to or greater than the threshold speed to display the second image 230 of the first source 210.

In addition, if the mobile device 100 displays the first image of the first source 210, the controller 140 may detect the horizontal slide gesture less than the threshold speed to display the fourth image 510 of the second source.

That is, the controller 140 may change and set a gesture executed in a case in which the speed of the gesture is equal to or greater than/less than the threshold speed. However, the disclosure is not limited to the above embodiment. In the disclosure, however, the controller 140 sets the horizontal slide gesture equal to or greater than the threshold speed as a method of image switching between the sources for the convenience of description. On the other hand, the controller 140 sets the horizontal slide gesture less than the threshold speed as a method of image switching in the same source. In connection with this case, as previously described, the controller 140 differentiate between the first gesture in the first direction and the second gesture in the second direction based on the threshold speed. However, the disclosure is not limited to the above embodiment.

In addition, according to an embodiment, the controller 140 may further display an indicator to differentiate the horizontal slide gesture. At this time, the controller 140 may detect an input for the indicator, detect the horizontal slide gesture, and switch between images captured from different sources. At this time, the input for the indicator may be a touch input, an input performed by an input device, or a voice input. In addition, in a case in which the controller 140 detects the horizontal slide gesture without detecting the input for the indicator, the controller 140 may switch between images in the same source. That is, the controller 140 may differently set the image switching method depending upon whether the controller detects the input for the indicator.

In addition, according to an embodiment, the controller 140 may detect the movement distance of the gesture to differentiate the horizontal slide gesture. At this time, the gesture differentiating method is not limited to the above description. The controller 140 may differentiate the gesture using an additional input.

In addition, according to an embodiment, the first gesture in the first direction and the second gesture in the second direction are not limited to the above embodiment. The controller 140 may change and set the direction, distance, speed, time, etc. of the gesture.

Figure 6:
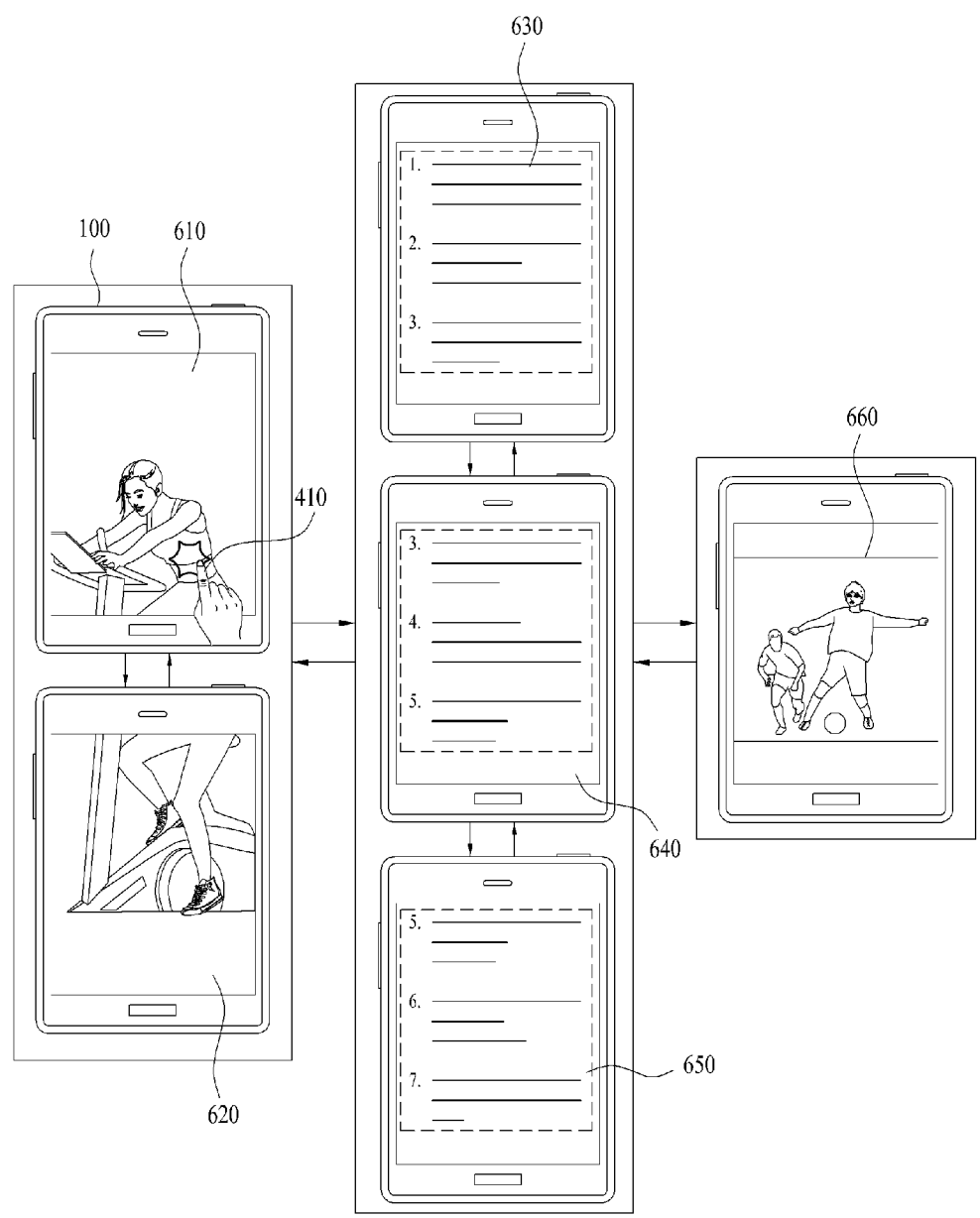
FIG. 6 is a view showing a method of the mobile device 100 switching between and displaying a plurality of image captured from a plurality of sources in accordance with an embodiment of the disclosure.

FIG. 6 is a view showing a method of the mobile device 100 switching between and displaying a plurality of image captured from a plurality of sources in accordance with an embodiment of the disclosure.

Referring to FIG. 6, the controller 140 may display a 1-1 image 610 and a 1-2 image 620 captured and stored from a first source. In addition, the controller 140 may display a 2-1 image 630, a 2-2 image 640, and a 2-3 image 650 captured and stored from a second source. In addition, the controller 140 may display a 3-1 image 660 captured and stored from a third source. At this time, the controller 140 may switch among and display the images. According to an embodiment of the disclosure, if the mobile device 100 displays the 1-1 image 610 or the 1-2 image 620, the controller 140 may detect a horizontal slide gesture to switch to and display a representative image of the second source.

At this time, as previously described, the horizontal slide gesture may mean a gesture in a case in which the controller 140 detects that the gesture moves from a detected control input position to the left. In addition, if the mobile device 100 displays the 2-1 image 630, the 2-2 image 640, and the 2-3 image 650, the controller 140 may detect the horizontal slide gesture to switch to and display a representative image of the first or third source. At this time, if the controller 140 detects a left horizontal slide gesture, the controller 140 may switch to and display a representative image of the third source. On the other hand, if the controller 140 detects a right horizontal slide gesture, the controller 140 may switch to and display the representative image of the first source. According to an embodiment, the above representative images may be predetermined images representing the respective images, which are set by a user or the controller 140. In addition, according to an embodiment, the controller 140 may be set the last displayed images as representative images.

In addition, for a source of images captured in the upper and lower position relationship, the controller 140 may set an image captured from the uppermost position of the source as a representative image. On the other hand, for a source of images captured in the left and right position relationship, the controller 140 may set an image captured from the leftmost upper position of the source as a representative image. That is, the controller 140 may convert and set the representative image. However, the disclosure is not limited to the above embodiment.

According to the disclosure, if the mobile device 100 displays the 2-1 image 630 of the second source, the controller 140 may detect a vertical slide gesture to switch to and display the 2-2 image 640 of the second source. At this time, the vertical slide gesture may be a gesture in a case in which the controller 140 detects that the gesture moves upward from a detected control input position. In addition, in a case in which the mobile device 100 displays the 2-2 image 640 of the second source, the controller 140 may detect the vertical slide gesture to switch to and display the 2-1 image 630 or the 2-3 image 650 of the second source. At this time, if the controller 140 detects an upward vertical slide gesture, the controller 140 may switch to and display the 2-3 image 650. On the other hand, if the controller 140 detects a downward vertical slide gesture, the controller 140 may switch to and display the 2-1 image 630. In a more detailed embodiment, the following table may be provided.

TABLE 1

| Image | Input | | | |
|---|---|---|---|---|
| | Left horizontal input | Right horizontal input | Upward vertical input | Downward vertical input |
| 1-1 image | Representative image of second source | Representative image of third source | 1-2 image | 1-2 image |
| 1-2 image | Representative image of second source | Representative image of third source | 1-1 image | 1-1 image |
| 2-1 image | Representative image of third source | Representative image of first source | 2-2 image | 2-3 image |
| 2-2 image | Representative image of third source | Representative image of first source | 2-3 image | 2-1 image |
| 2-3 image | Representative image of third source | Representative image of first source | 2-1 image | 2-2 image |
| 3-1 image | Representative image of first source | Representative image of second source | — | — |

Figure 7:
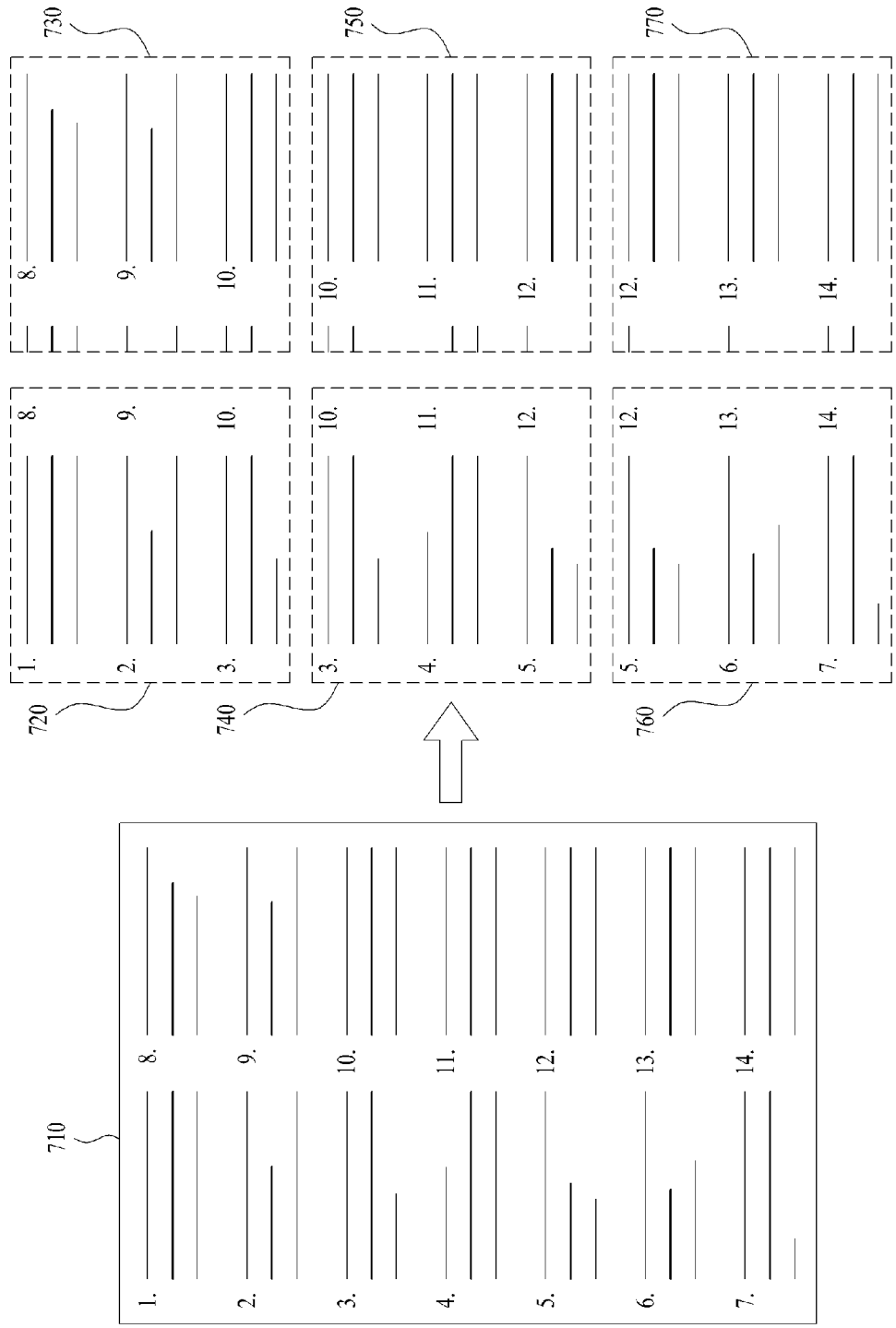
FIG. 7 is a view showing a method of the mobile device 100 capturing a plurality of images located in an upper and lower position relationship and a left and right position relationship from the same source in accordance with an embodiment of the disclosure.

FIG. 7 is a view showing a method of the mobile device 100 capturing a plurality of images located in an upper and lower position relationship and a left and right position relationship from the same source in accordance with an embodiment of the disclosure. According to the disclosure, a first source 710 includes visual information regarding first to fourteenth paragraphs. At this time, as previously described, the mobile device 100 cannot display all of the visual information of the first source 710 at one time. Consequently, the mobile device 100 may display an area of the visual information of the first source 710 equivalent to the size of the display unit 120 and capture and store the displayed area as an image.

According to an embodiment, the mobile device 100 may capture and store an area of the visual information of the first source in which the first to third paragraphs are fully displayed and the eighth to tenth paragraphs are partially displayed as a first image 720. Subsequently, the controller 140 may detect a control input for scroll. At this time, if the controller 140 detects a control input for horizontal scroll, the mobile device 100 may partially display the first to third paragraphs and fully display the eighth to tenth paragraphs and capture and store the displayed area as a second image 730.

On the other hand, if the controller 140 detects a control input for vertical scroll, the mobile device 100 may fully display the third to fifth paragraphs and partially display the tenth to twelfth paragraphs and capture and store the displayed area as a third image 740. Subsequently, the controller 140 may detect a control input for scroll. At this time, if the controller 140 detects a control input for horizontal scroll, the mobile device 100 may partially display the third to fifth paragraphs and fully display the tenth to twelfth paragraphs and capture and store the displayed area as a fourth image 750.

According to the above process, if the mobile device 100 displays the visual information of the first source 710, the controller 140 may detect a control input for horizontal or vertical scroll to display, capture, and store a fifth image 760 and a sixth image 770. That is, the controller 140 may divide the visual information of the first source 710 into a plurality of images and capture and store the images.

At this time, the controller 140 may display the images 720, 730, 740, 750, 760, and 770 captured from the same first source 710. In a case in which the controller 140 switches among the images, the controller 140 may perform image switching between sources and display a switched image through a first gesture in a first direction. In addition, the controller 140 may perform image switching in the same source and display a switched image through a second gesture in a second direction.

As an example, the controller 140 may set the second gesture in the second direction as a horizontal slide gesture or a vertical slide gesture. More specifically, if the mobile device 100 displays the first image 720 of the first source 710, the controller 140 may detect a horizontal slide gesture as the second gesture in the second direction to switch to and display the second image 730. On the other hand, if the mobile device 100 displays the first image 720 of the first source 710, the controller 140 may detect a vertical slide gesture as the second gesture in the second direction to switch to and display the third image 740. That is, the controller 140 may detect the second gesture in the second direction as a vertical slide gesture or a horizontal slide gesture to perform image switching in the first source 710.

In addition, if the mobile device 100 displays the first image 720 of the first source 710, the controller 140 may perform image switching between sources and display a switched image through the first gesture in the first direction. As an example, the controller 140 may set the first gesture in the first direction as a horizontal slide gesture. At this time, if the second gesture in the second direction is a horizontal slide gesture, the second gesture in the second direction and the first gesture in the first direction are the same. if the controller 140 detects the horizontal slide gesture as the first gesture in the first direction, therefore, the controller 140 may determine whether the speed of the horizontal slide gesture is equal to or greater than threshold speed to detect the first gesture in the first direction. That is, if the mobile device 100 displays the first image 720 of the first source 710 and the controller 140 detects the horizontal slide gesture less than the threshold speed, the controller 140 may switch to and display the second image 730. On the other hand, if the controller 140 detects the horizontal slide gesture equal to or greater than the threshold speed, the controller 140 may switch to and display a representative image of a second source (not shown). As a result, the mobile device 100 may perform a plurality of images located in the upper and lower position relationship and the left and right position relationship of the first source and display a switched image.

In addition, the controller 140 may change and set a gesture executed in a case in which the speed of the gesture is equal to or greater than/less than the threshold speed. However, the disclosure is not limited to the above embodiment.

Figure 8:
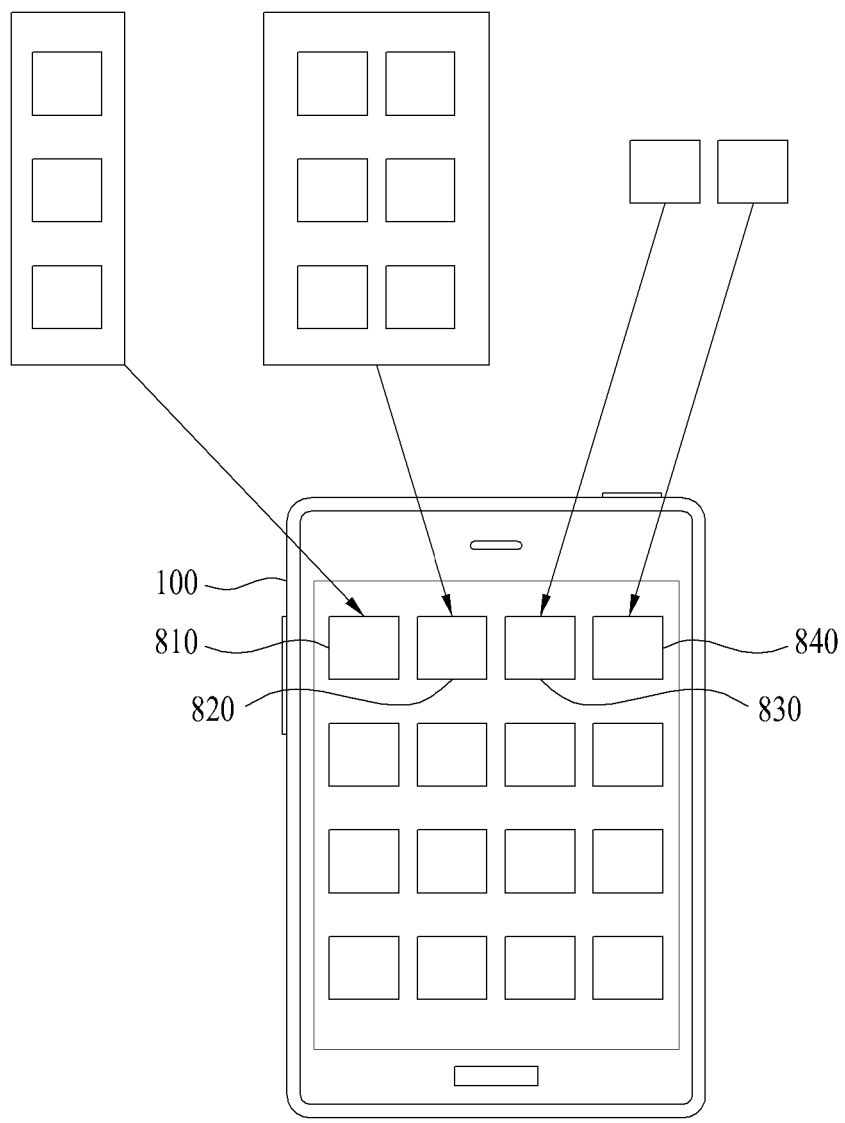
FIG. 8 is a view showing a method of the mobile device 100 displaying a plurality of sources in accordance with an embodiment of the disclosure.

FIG. 8 is a view showing a method of the mobile device 100 displaying a plurality of sources in a thumbnail mode in accordance with an embodiment of the disclosure. According to the disclosure, the mobile device 100 may display a plurality of sources in a navigation mode having thumbnails. In addition, the mobile device 100 may display at least one of a plurality of thumbnail images in a window mode. At this time, some of the sources may include a plurality of images. As an example, the mobile device 100 may display the thumbnail images per source. At this time, the mobile device 100 may display a first source 810, in which three images in an upper and lower position relationship are captured and stored, as one thumbnail image. In addition, the mobile device 100 may display a second source 820, in which six images in an upper and lower position relationship or a left and right position relationship are captured and stored, as one thumbnail image. In addition, the mobile device 100 may display a third source 830 and a fourth source 840 including one image in a thumbnail form. At this time, according to the disclosure, the mobile device 100 may detect the thumbnail images of each source as one folder. In addition, the mobile device 100 may couple or link the thumbnail images of each source to differentiate between the sources.

In addition, according to the disclosure, the mobile device 100 may display the thumbnail images as representative images of the respective sources. More specifically, as previously described, the representative images may be predetermined as images representing the respective sources, which are set by a user or the controller 140. In addition, according to an embodiment, the controller 140 may be set the last displayed images as representative images. In addition, for a source of images captured in the upper and lower position relationship, the controller 140 may set an image captured from the uppermost position of the source as a representative image. On the other hand, for a source of images captured in the left and right position relationship, the controller 140 may set an image captured from the leftmost upper position of the source as a representative image. That is, the controller 140 may differently set the representative image. However, the disclosure is not limited to the above embodiment.

In addition, according to the disclosure, the mobile device 100 may display the thumbnail images of each source in an overlapping state. More specifically, the mobile device 100 may display a plurality of thumbnail images included in each source in a state in which the thumbnail images partially overlap each other. As a result, the user may confirm how many images are included in each source.

In addition, as an example, the mobile device 100 may detect a user's input for a thumbnail image. At this time, the user's input may be a touch input, an input performed by an input device, or a voice input. In a case in which the mobile device 100 may detect the user's input, the mobile device 100 may display the thumbnail images of the source located at the detected position in the window mode. At this time, the mobile device 100 may display a representative image. As a result, the user may differentiate between the images of the sources in the thumbnail mode.

Figure 9:
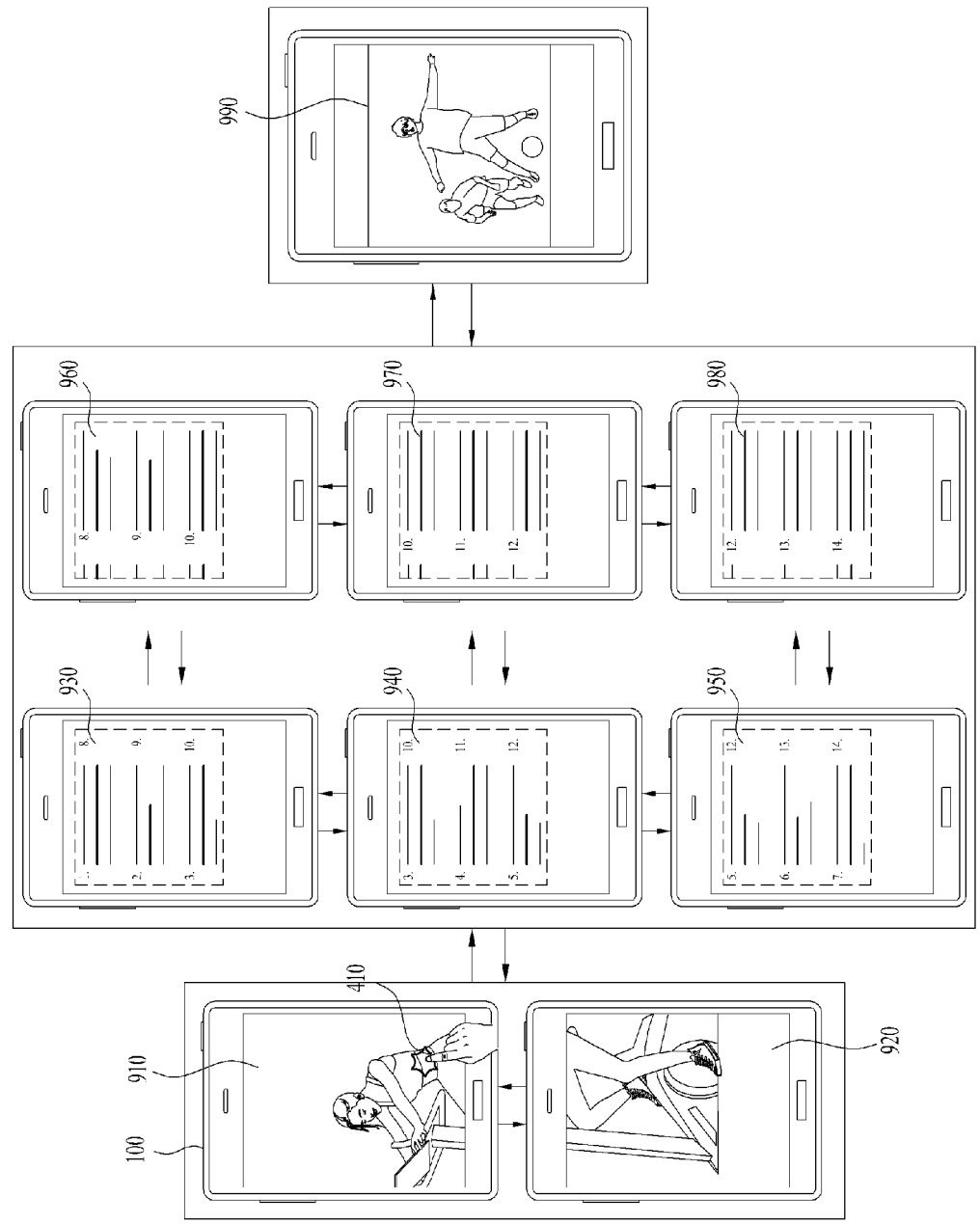
FIG. 9 is a view showing a method of the mobile device 100 displaying a plurality of sources in a window mode in accordance with an embodiment of the disclosure.

FIG. 9 is a view showing a method of the mobile device 100 displaying a plurality of sources in a window mode in accordance with an embodiment of the disclosure. According to the disclosure, the mobile device 100 at least one of a plurality of thumbnail images in the window mode.

Referring to FIG. 9, the controller 140 may display a 1-1 image 910 and a 1-2 image 920 captured and stored from a first source. In addition, the controller 140 may display a 2-1 image 930, a 2-2 image 940, a 2-3 image 950, a 2-4 image 960, a 2-5 image 970, and a 2-6 image 980 captured and stored from a second source. In addition, the controller 140 may display a 3-1 image 990 captured and stored from a third source. At this time, the controller 140 may switch among and display the images of the first source, the second source, and the third source as previously described.

In addition, according to an embodiment of the disclosure, the controller 140 may perform image switching in the second source, in which the images are captured and stored in an upper and lower position relationship or in a left and right position relationship. More specifically, in a case in which the mobile device 100 displays the 2-1 image 930, the controller 140 may detect a horizontal slide gesture equal to or greater than threshold speed to switch to and display a representative image of the third source or a representative image of the first source. At this time, the horizontal slide gesture may be a first gesture in a first direction. At this time, if the controller 140 detects a left horizontal slide gesture, the controller 140 may switch to and display the representative image of the third source. At this time, the representative image of the third source may be the image 990 included in the third source. On the other hand, if the controller 140 detects a right horizontal slide gesture, the controller 140 may switch to and display the representative image of the first source.

In addition, if the mobile device 100 displays the 2-1 image 930, the controller 140 may detect a horizontal slide gesture less than the threshold speed to switch to and display the 2-4 image 960 of the second source. At this time, the horizontal slide gesture may be a second gesture in a second direction.

In addition, if the mobile device 100 displays the 2-1 image 930, the controller 140 may detect a vertical slide gesture to switch to and display the 2-2 image 940. At this time, the vertical slide gesture may be the second gesture in the second direction. That is, in a case in which a plurality of images are captured and stored from the same source in the upper and lower position relationship and in the left and right position relationship, the controller 140 may set the second gesture in the second direction as the vertical slide gesture or the horizontal slide gesture less than the threshold speed.

In addition, the controller 140 may change and set a gesture executed in a case in which the speed of the gesture is equal to or greater than/less than the threshold speed. However, the disclosure is not limited to the above embodiment.

Figure 10:
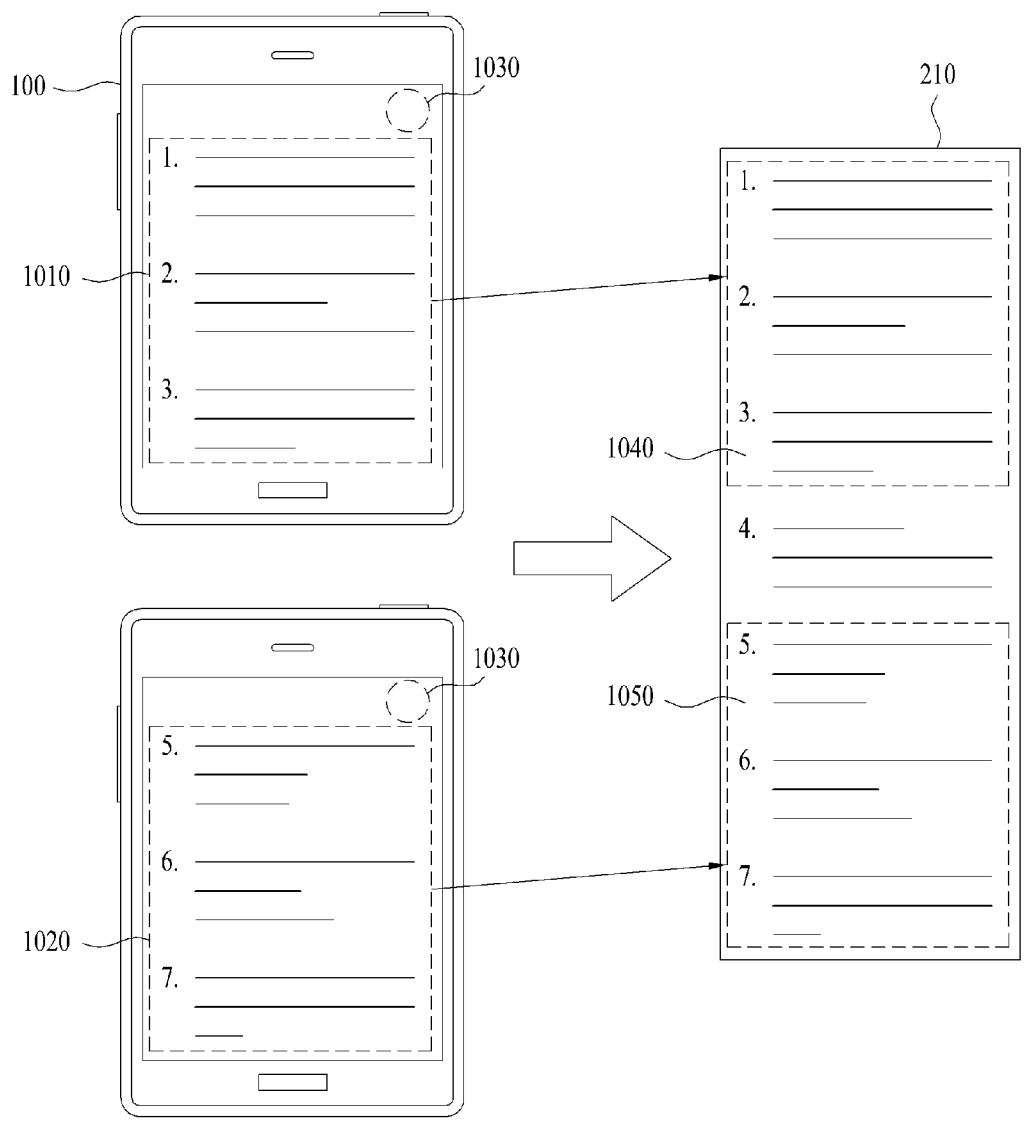
FIG. 10 is a view showing a method of the mobile device 100 moving to source information using a source indicator in accordance with an embodiment of the disclosure.

FIG. 10 is a view showing a method of the mobile device 100 moving to source information using a source indicator in accordance with an embodiment of the disclosure. According to the disclosure, if the controller captures and stores displayed visual information as an image, the controller 140 may store the image including source information regarding the image. At this time, the source information may be information regarding the source from which the image has been captured. In addition, as an example, the source information may include source address information of the source from which the image has been captured. More specifically, the source address information may be address information which the mobile device 100 uses to display the visual information of the source. At this time, the source address information may be a URL address or a network protocol. In addition, the source address information means unique address information that can detect one source. However, the source address information is not limited to specific protocol information. In addition, the source information may include position information of the image in the source from which the image has been captured.

More specifically, as previously described, the mobile device 100 cannot display all of the visual information of the source. If the mobile device 100 captures and stores visual information as an image, therefore, the mobile device 100 may store a specific area in the source as an image. At this time, images are in an upper and lower position relationship or in a left and right position relationship in the source. In a case in which the mobile device 100 displays the visual information of the source as source information, therefore, the mobile device 100 may display an area in which images captured according to the upper and lower position relationship or the left and right position relationship match with each other in the source. As a result, the user may acquire position information in the source of the image captured by the mobile device 100. In addition, the source information is not limited to the above information regarding the above embodiment. The source may include information indicating characteristics of the source, such as information regarding the size of the entire area of the source and information regarding the number of images captured from the source.

In addition, if the controller 140 displays an image, the controller 140 may further display a source indicator 1030 for the image. At this time, the controller 140 may set the position at which the source indicator 1030 is displayed, the size of the source indicator 1030, etc. In addition, the controller 140 may set the source indicator 1030 such that the source indicator 1030 is linked to the source address. In addition, as an example, the controller 140 may include source information of the source indicator 1030. More specifically, the controller 140 may detect an input for the source indicator 1030. At this time, the input may be a touch input, an input performed by an input device, or a voice input. According to the disclosure, in a case in which the controller 140 detects an input for the source indicator 1030, the controller 140 may move to the source linked to the source indicator 1030 based on the source information of the image and display the visual information of the source. In addition, if the controller 140 detects an input for the source indicator 1030, the controller 140 may move to the source linked to the source indicator 1030, determine a position relationship among the images in the source, and display the positions of the images. In addition, as an example, if the controller 140 detects an input for the source indicator 1030, the controller 140 may further display text information of the source based on the source information. That is, the controller 140 may display the text information of the source while displaying the image. In addition, as an example, the controller 140 may output audio information of the source. As a result, the user may confirm the source information of the image.

As an example, referring to FIG. 10, the controller 140 may display a first image 1010 or a second image 1020 captured from a first source 210. At this time, the controller 140 may further display the source indicator 1030. At this time, the controller 140 may display the source indicator 1030 at the upper end of the mobile device 100 in a circular form. In addition, the controller 140 may differently set the position at which the source indicator 1030 is displayed and the shape in which the source indicator 1030 is displayed and then display the source indicator 1030.

According to the disclosure, if the controller 140 displays the first image 1010, the controller 140 may detect an input for the source indicator 1030. At this time, the controller 140 may move to the first source 210, from which the first image has been captured, according to the source address information of the first image 1010 and display the visual information of the first source 210. At this time, as an example, the controller 140 may display information located at the uppermost position of the first source 210. In addition, the controller 140 may display a position 1040 at which the first image 101 has been captured. More specifically, the controller 140 may search for the same portions as first and third paragraphs of the first image 1010 from the first source 210 to display visual information regarding a position 1040 of the first and third paragraphs.

In addition, in a case in which the controller 140 displays the second image 1020, the controller 140 may detect an input for the source indicator 1030. At this time, the controller 140 may move to the first source 210, from which the second image has been captured, according to the source address information of the second image 1020. At this time, the controller 140 may search for the same portions as fifth and seventh paragraphs of the second image 1020 from the first source 210 to display visual information regarding a position 1050 of the fifth and seventh paragraphs.

Figure 11A:
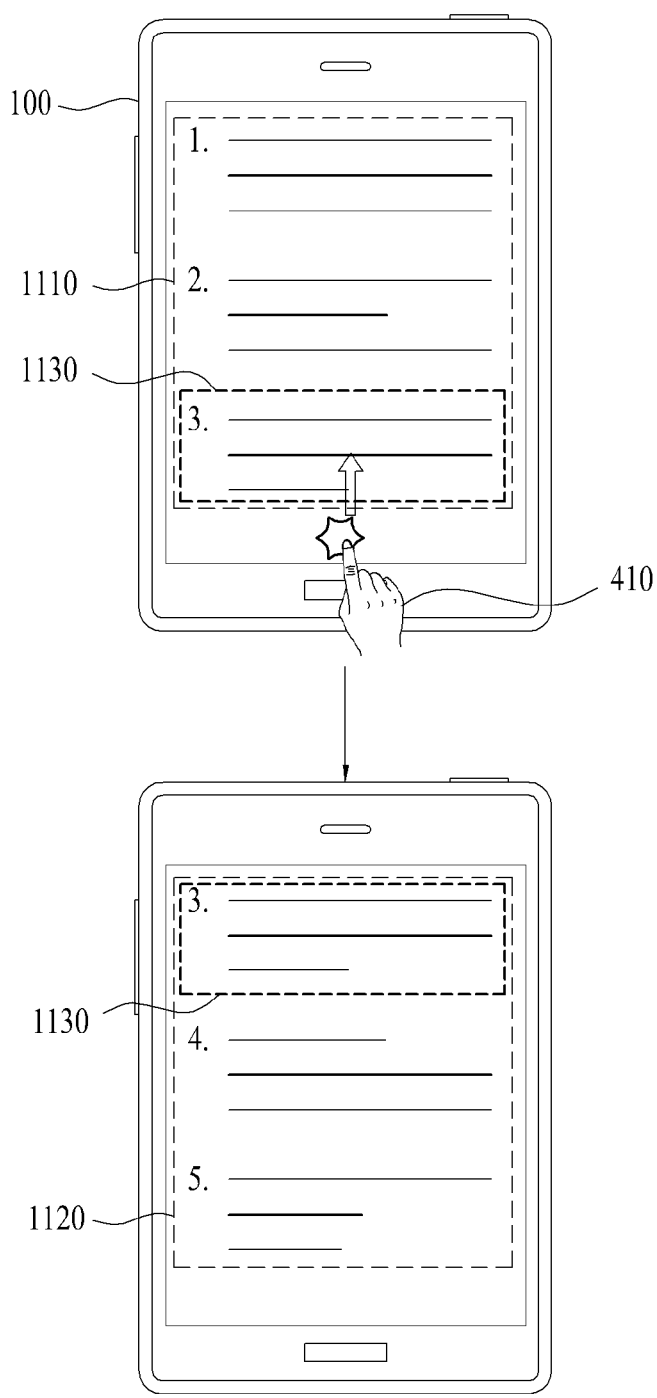
FIGS. 11A to 11C are views showing a method of the mobile device 100 displaying an image overlap area in accordance with an embodiment of the disclosure.
Figure 11B:
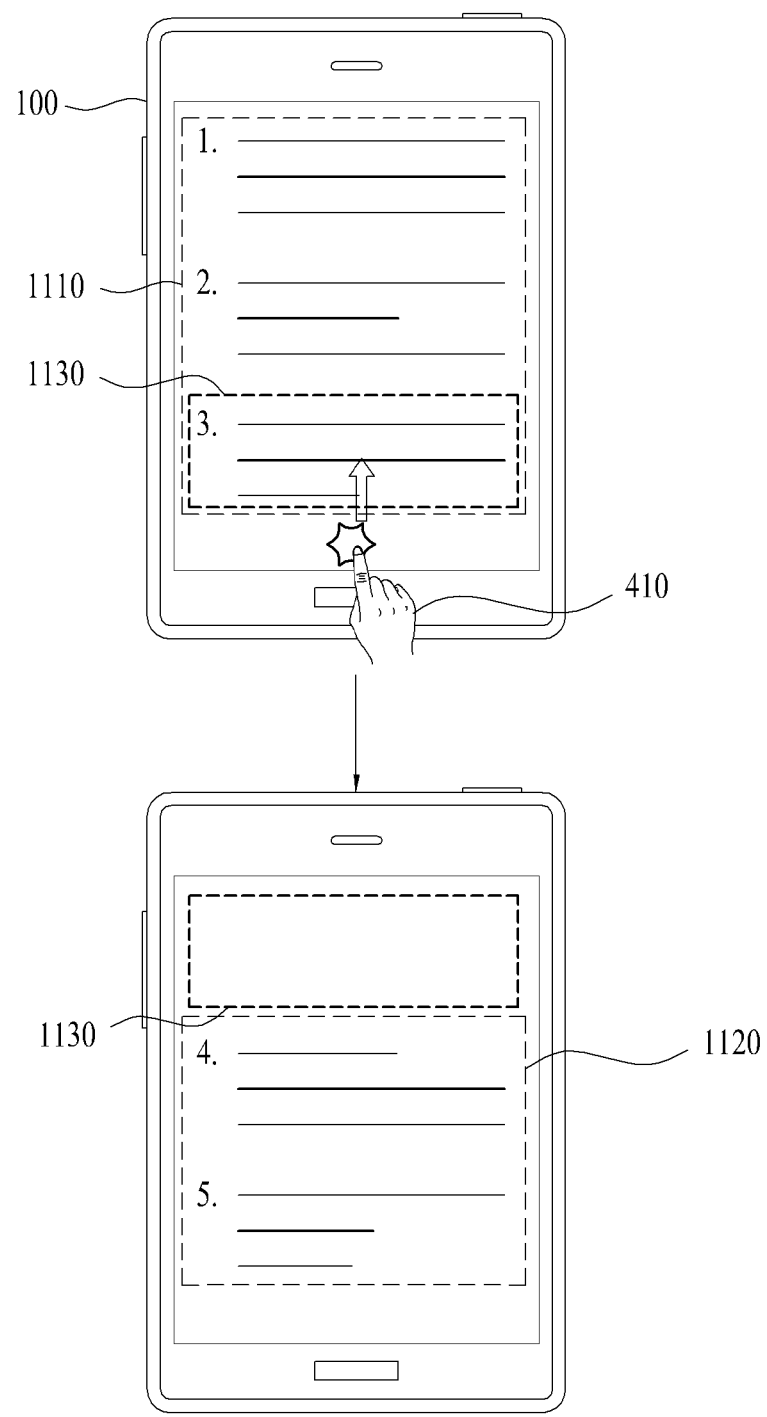
Figure 11C:
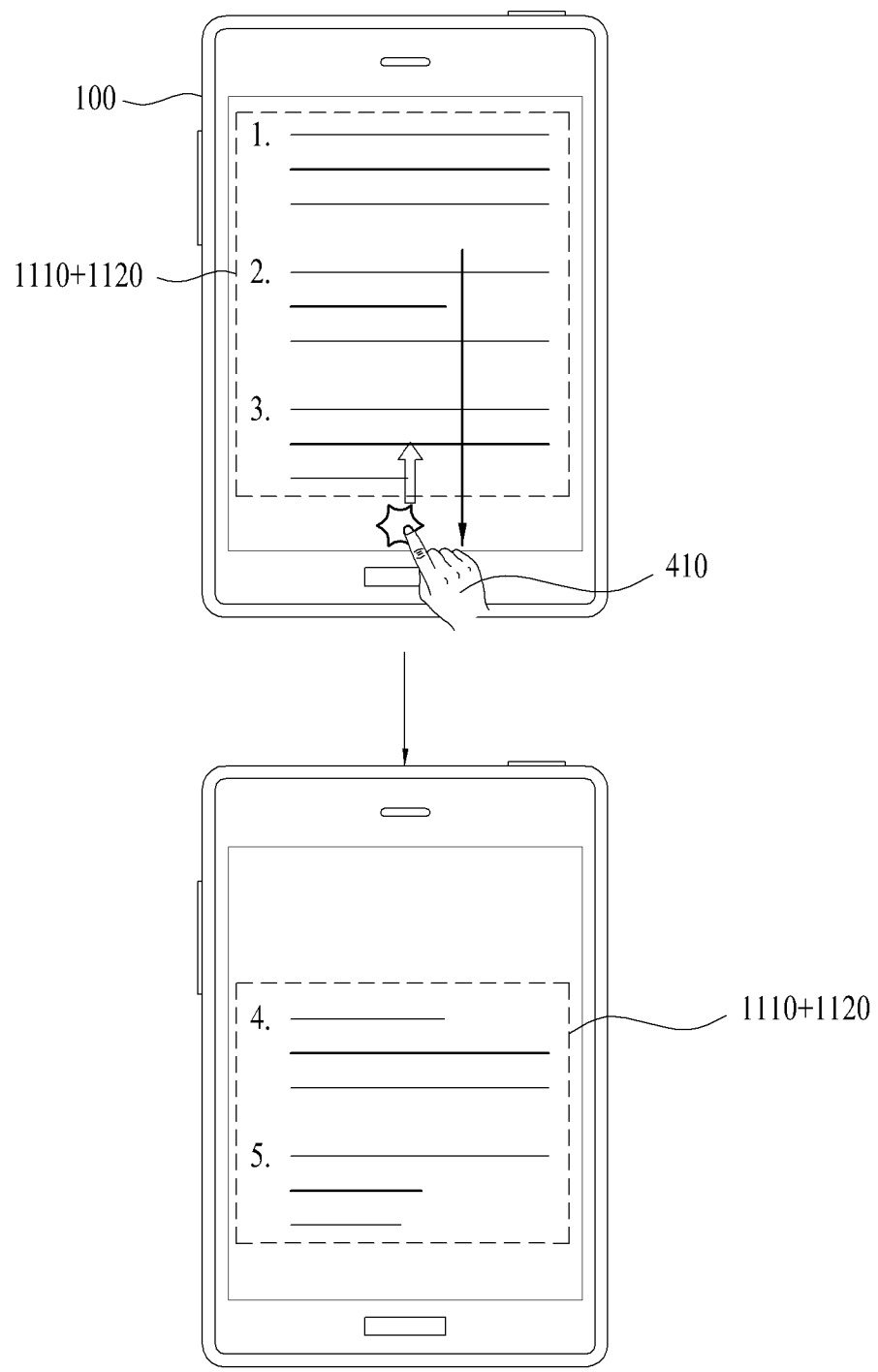

FIGS. 11A to 11C are views showing a method of the mobile device 100 displaying an image overlap area in accordance with an embodiment of the disclosure. According to the disclosure, if the controller 140 captures an image from a first source, the controller 140 may capture and store visual information including an overlap region as an image. More specifically, the controller 140 may display an undisplayed area of the first source through scroll. At this time, the controller 140 may display a portion of the displayed area before scroll in an overlapping state. In a case in which the controller 140 captures and stores displayed visual information as a plurality of images, therefore, the controller 140 may stores the images in a state in which partial areas of the images overlap each other. That is, the images may include partial overlap areas. At this time, the controller 140 may detect the overlap areas of the images during image switching. More specifically, referring to FIG. 11A, the controller 140 may detect an overlap area between a first image 1110 and a second image 1120. According to the disclosure, as an example, the overlap area may vary depending upon a position relationship between the first image 1110 and the second image 1120.

In a case in which the controller 140 switches from the first image 1110 to the second image 1120, if an overlap area is present between the first image 1110 and the second image 1120, the controller 140 may display the overlap area on at least one of the first image 1110 and the second image 1120. More specifically, the controller 140 may display the overlap area, i.e. a third paragraph, on the first image 1110 as an indicator 1130. On the other hand, the controller 140 may display the overlap area, i.e. the third paragraph, on the second image 1120 as the indicator 1130. As a result, the user may confirm the overlap area and thus the image during image switching.

In addition, as an example, referring to FIG. 11B, in a case in which the controller 140 switches from the first image 1110 to the second image 1120 and displays the second image 1120, if an overlap area is present between the first image 1110 and the second image 1120, the controller 140 may display the second image 1120 excluding the overlap area. More specifically, in a case in which the controller 140 displays the second image 1120, the controller 140 may display the second image 1120 excluding an indicator 1130 indicating the overlap area. At this time, as an example, the controller 140 may display the indicator 1130 on the overlap area of on the second image 1120. As a result, the user may connect and confirm the images excluding the overlap area during image switching.

In addition, as an example, referring to FIG. 11C, in a case in which an overlap area is present, the controller 140 may not switch from the first image 1110 to the second image 1120 but couple the first image 1110 and the second image 1120 and display the images through scroll. More specifically, if an overlap area is present, the controller 140 may couple the first image 1110 and the second image 1120. At this time, if the controller 140 detects a vertical slide gesture as a second gesture in a second direction, the controller 140 may delete an area of the second image 1120 overlapping the first image 1110 and sequentially display the images through scroll. That is, the controller 140 may display the images in the same manner as in the method of displaying visual information in the source through scroll.

In addition, according to the disclosure, as an example, the first image 1110 and the second image 1120 may be in a left and right position relationship. At this time, the controller 140 may display the indicator 1130 on the overlap area between the first image 1110 and the second image 1120 and detect a horizontal slide gesture as the second gesture in the second direction. At this time, the controller 140 may delete an area of the second image 1120 overlapping the first image 1110 and sequentially display the images through scroll. That is, the controller 140 may display the images in the same manner as in the method of displaying visual information in the source through scroll.

In addition, according to the disclosure, as an example, the first image 1110 and the second image 1120 may overlap each other at left and right positions or at left and right positions. At this time, the controller 140 may display the images through scroll in an overlapping direction. As an example, the scroll direction may be a slide gesture in a diagonal direction. However, the disclosure is not limited to the above embodiment. The controller 140 may convert and set the gesture.

Figure 12A:
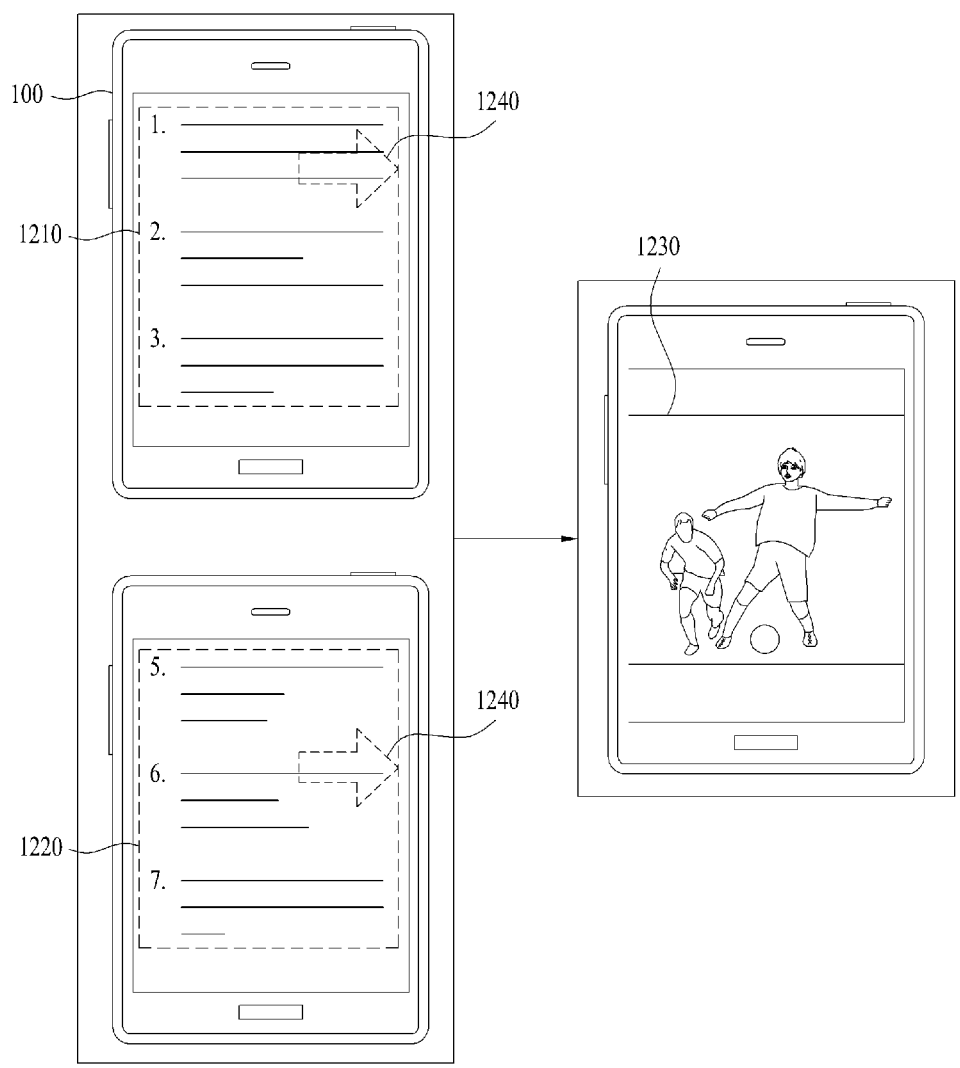

FIGS. 12A to 12C are views showing a method of the mobile device 100 displaying an indicator to guide a user's gesture in accordance with an embodiment of the disclosure.

According to the disclosure, the controller 140 may display an indicator to inform a user that a plurality of images is captured and stored from the same source. In addition, the controller 140 may display an indicator to guide a user's gesture. More specifically, in a case in which a plurality of images is captured from a first source, the controller 140 may differently set an image switching method according to a control input. At this time, the controller 140 may guide a user's gesture to perform a control input desired by the user.

As an example, referring to FIG. 12A, the controller 140 may display a first indicator 1240 for image switching between sources. More specifically, if the controller 140 displays a first image 1210 or a second image 1220 of the first source, the controller 140 may further display a first indicator 1240. At this time, the controller 140 may set the first indicator 1240 as an indicator to guide switching to a third image 1230 of a second source. At this time, the controller 140 may differently set the position at which the first indicator 1240 is displayed, the size of the first indicator 1240, the shape of the first indicator 1240, etc.

In addition, according to an embodiment, if the controller 140 detects an input for the first indicator 1240, the controller 140 may switch to and display the third image 1230 of the second source.

In addition, the first image 1210 and the second image 1220 may be captured in a left and right position relationship and stored as images. At this time, the controller 140 may use the first indicator 1240 to switch to the third image 1230 of the second source. More specifically, the controller 140 may display information to guide the user to execute a horizontal slide gesture at predetermined speed or more through the first indicator 1240. As an example, the controller 140 may modify the position and shape of the first indicator 1240 to guide the user to execute the gesture at high speed.

In addition, referring to FIG. 12B, the controller 140 may display a second indicator 1250 for image switching in the first source. At this time, the second indicator 1250 may guide switching between the first image 1210 and the second image 1220 captured and stored from the first source.

As an example, the controller 140 may display the first image 1210 or the second image 1220 in an upper and lower position relationship from the first source. At this time, if the controller 140 detects a vertical slide gesture, the controller 140 may perform image switching between the first image 1210 and the second image 1220. if the controller 140 displays the first image 1210 or the second image 1220, therefore, the controller 140 may further display the second indicator 1250 to guide the vertical slide gesture. More specifically, if the controller 140 displays the first image 1210, the controller 140 may detect a gesture moving downward from the position of a control input to switch to and display the second image 1220. At this time, the controller 130 may display the second indicator 1250 in the form of a downward arrow to guide a user's gesture. On the other hand, in a case in which the controller 140 displays the second image 1220, the controller 140 may detect a gesture moving upward from the position of the control input to switch to and display the first image 1210. At this time, the controller 130 may display the second indicator 1250 in the form of an upward arrow to guide a user's gesture. At this time, as an example, in a case in which the controller 140 detects an input for the second indicator 1250, the controller 140 may perform image switching in the first source.

In addition, the controller 140 may further display the second indicator 1250 to perform switching between images captured and stored in the left and right position relationship from the same source. At this time, the second indicator 1250 may be an indicator to guide a horizontal slide gesture. More specifically, the controller 140 may display information to guide the user to execute the horizontal slide gesture at less than predetermined speed through the second indicator 1250. As an example, the controller 140 may modify the position and shape of the second indicator 1250 to guide the user to execute the gesture at slow speed.

Referring to FIG. 12C, in a case in which the controller 140 displays the last one of the images captured from the first source, the controller 140 may further display a last image indicator 1260. As a result, the user may confirm that the last image is being displayed in the source. At this time, the last image may be an image finally captured from the same source. Alternatively, the last image may be an image captured at the lowermost end of the same source. Alternatively, the last image may be an image captured at the rightmost side of the same source.

According to the disclosure, the controller 140 may display the last image indicator 1260 at the lower end of the image. In addition, the controller 140 may change the positions at which the above indicators are displayed, the shape of the above indicators, or the sizes of the above indicators. However, the disclosure is not limited to the above embodiment.

In addition, as an example, the controller 140 may transmit the above indicator to the user using a voice or a tactile sensation.

Figure 13:
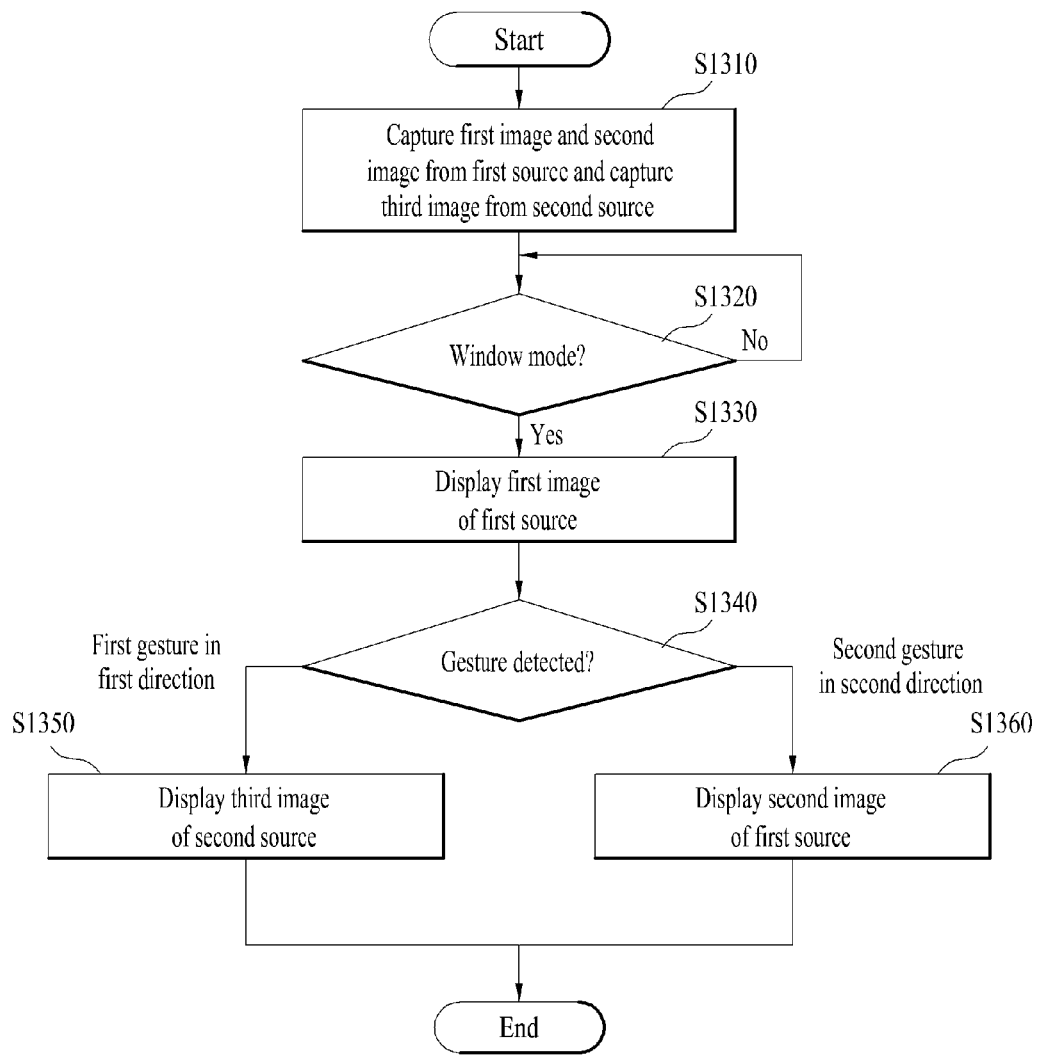
FIG. 13 is a flowchart showing a method of the mobile device 100 capturing and displaying a plurality of images in accordance with an embodiment of the disclosure.

FIG. 13 is a flowchart showing a method of the mobile device 100 capturing and displaying a plurality of images in accordance with an embodiment of the disclosure. Steps of FIG. 13, which will hereinafter be described, may be controlled by the controller 140 of the mobile device shown in FIG. 1. In addition, in the embodiment of FIG. 13, a detailed description of the parts identical or equivalent to what are described with reference to FIGS. 1 to 12 will be omitted.

The controller 140 may capture and store a first image and a second image from a first source and may capture and store a third image from a second source (S1310). At this time, as previously described with reference to FIG. 2, an area displayed by the mobile device 100 is limited with the result that only a partial area of visual information of the first source may be displayed. Consequently, the controller 140 may display an undisplayed area through scroll. Subsequently, the controller 140 may capture and store the display area as a first mage and a second image. At this time, the first mage and the second image may be in an upper and lower position relationship or in a left and right position relationship in the first source.

More specifically, as previously described with reference to FIG. 2, in a case in which the controller 140 detects a control input for vertical scroll according to a position relationship in the first source 210, the upper and lower position relationship may be a relationship among the images 220, 230, and 240 displayed by the mobile device 100. That is, in a case in which the mobile device 100 displays an area of the visual information limited to the size of the display unit 120, the controller 140 may detect vertical scroll as a control input to display an undisplayed area of the visual information in the upper and lower position relationship.

In addition, in a case in which the controller 140 detects a control input for horizontal scroll according to a position relationship in the first source 210, the left and right position relationship may be a relationship among the images 220, 230, and 240 displayed by the mobile device 100. That is, in a case in which the mobile device 100 displays an area of the visual information limited to the size of the display unit 120, the controller 140 may detect horizontal scroll as a control input to display an undisplayed area of the visual information in the left and right position relationship.

Subsequently, the controller 140 may display the captured images in a window mode (S1320). As previously described with reference to FIG. 3, the mobile device 100 may display images in a navigation mode to display captured and stored images as a plurality of thumbnail images 310. In addition, the mobile device 100 may display images in a window mode to select and display at least one of the thumbnail images 310. The thumbnail images 310 are images which are displayed in a state in which the sizes of the images are reduced to view the entire layout of the images. In addition, the navigation mode is a mode to display the thumbnail images 310 such that a user can search for and select a desired one of the thumbnail images 310. According to an embodiment, the mobile device 100 may reduce the sizes of the thumbnail images 310 to the same size and display the thumbnail images 310 having the reduced size. In addition, in a case in which the mobile device 100 cannot display all of the thumbnail images 310 on the display unit 120, the controller 140 may detect a control input for scrolling the thumbnail images 310 to search for and select a desired one of the thumbnail images 310 in the navigation mode.

At this time, the navigation mode is a mode set such that the user can search for the images stored in the mobile device 10. However, the disclosure is not limited to the above embodiment.

In addition, the controller 140 may display images in the window mode. The window mode is a mode to select and display at least one of the thumbnail images 310 as a window image 320. That is, the mobile device 100 may display a large image through the window mode. At this time, the mobile device 100 may display the window image 320 as a full screen on the display unit 120. That is, the mobile device 100 may display the window image 320 in a state in which the window image 320 has the size of the display unit 120. In addition, according to an example, the mobile device 100 may display the window image 320 on a partial area of the display unit 120. At this time, the controller 140 may adjust the ratio, size, or resolution of the window image 320. In addition, the controller 140 may display a plurality of images on the display unit 120 as the window image 320.

Subsequently, the controller 140 may display the first image of the first source in a state in the captured images are displayed in the window mode (S1330). At this time, as previously described with reference to FIG. 2, the first image of the first source may be an image which has been first captured and stored from the first source. In addition, the first image of the first source may be an image which has been captured and stored at the uppermost or the leftmost position of the first source.

Subsequently, the controller 140 may detect a gesture (S1340). As previously described with reference to FIG. 4, the controller 140 may detect a gesture of moving from the position of a detected control input. More specifically, the controller 140 may detect a gesture of moving from the current control input position to the left as a left horizontal slide gesture. At this time, in a case in which the controller 140 detects a gesture of moving from the current control input position to the left, the controller 140 may detect a left horizontal slide gesture. In addition, in a case in which the controller 140 detects a gesture of moving to the right, the controller 140 may detect a right horizontal slide gesture. In addition, in a case in which the controller 140 may detect a gesture moving upward or downward from the position of a detected control input, the controller 140 may detect an upward vertical slide gesture or a downward vertical slide gesture. At this time, it is necessary for the mobile device 100 to differently set image switching gestures according to the position relationship among the images 220, 230, and 240. In addition, as an example, the controller 140 may detect another gesture moving in a direction other than the horizontal direction and the vertical direction.

Subsequently, the controller 140 may detect a first gesture in a first direction (S1350). As previously described with reference to FIGS. 5A and 5B, the controller 140 may set the first gesture in the first direction as a gesture for image switching between sources. More specifically, in a case in which the controller 140 captures the images of the first source 210 in the upper and lower position relationship, the controller 140 may set the first gesture in the first direction as a horizontal slide gesture. At this time, the controller 140 may set a second gesture in a second direction as a vertical slide gesture. As a result, the controller 140 may differentially perform a method of image switching between sources and a method of switching between images in the same source.

In addition, in a case in which the controller 140 captures the images of the first source in the left and right position relationship, the controller 140 may detect the first gesture in the first direction and the second gesture in the second direction as horizontal slide gestures. At this time, however, the first gesture in the first direction is the horizontal slide gesture moving at threshold speed or more. As a result, the controller 140 may differentiate between the above gesture and a gesture in which the image captured in the left and right position relationship are converted and displayed in the source.

Subsequently, the controller 140 may detect a second gesture in a second direction (S1360). As previously described with reference to FIGS. 5A and 5B, the controller 140 may set the second gesture in the second direction as a gesture for image switching in the same source. More specifically, in a case in which the controller 140 captures the first image and the second image of the first source in the upper and lower position relationship, the controller 140 may detect the second gesture in the second direction as a vertical slide gesture. As a result, the controller 140 may switch between the first image and the second image in the first source and display the switched image. On the other hand, in a case in which the controller 140 captures the first image and the second image of the first source in the left and right position relationship, the controller 140 may detect the second gesture in the second direction as a horizontal slide gesture. As a result, the controller 140 may switch between the first image and the second image in the first source and display the switched image. At this time, however, the controller 140 may set the horizontal slide gesture as a gesture moving at less than the threshold speed in order to differentiate from the image switching between the sources as described above.

While the disclosure has been described with reference to separate drawings for the convenience of description, a new embodiment may be implemented by combining embodiments illustrated in the drawings. As needed by those skilled in the art, designing a computer-readable recording medium, in which a program for implementing the afore-described embodiments is recorded, is within the scope of the disclosure.

The mobile device 100 and the control method thereof according to the disclosure are not limited to the configurations and methods of the exemplary embodiments set forth herein. The exemplary embodiments may be selectively combined in part or in whole to form various embodiments that all fall within the scope of the disclosure.

Meanwhile, the mobile device 100 and the control method thereof according to the disclosure may be implemented as code that can be written on a processor-readable recording medium and thus read by a processor provided in a networked device. The processor-readable recording medium may be any type of recording device in which data is stored in a processor-readable manner. The processor-readable recording medium may include, for example, a read only memory (ROM), a random access memory (RAM), a magnetic tape, a floppy disc, and an optical data storage device and may be implemented in the form of a carrier wave transmitted over the Internet. The processor-readable recording medium can be distributed over a plurality of computer systems connected to a network such that processor-readable code is written thereto and executed therefrom in a decentralized manner.

As is apparent from the above description, according to the disclosure, the mobile device may capture and store a displayed area as an image.

In addition, according to the disclosure, the mobile device may display an undisplayed area through scroll and capture and store the displayed area as an image.

In addition, according to the disclosure, the mobile device may set an image switching gesture in consideration of a position relationship of images captured and stored from the same source.

In addition, according to the disclosure, the mobile device may know source information of a captured and stored image and position information of an image in a source.

In addition, according to the disclosure, the mobile device may check an overlap area between images captured and stored from the same source and display the images excluding the overlap area when switching between the images is performed.

In addition, according to the disclosure, the mobile device may couple images captured and stored from the same source such that the images are displayed through scroll without image switching.

In addition, according to the disclosure, the mobile device may display an indicator to guide a user's gesture.

It will be apparent that, although the preferred embodiments have been shown and described above, the disclosure is not limited to the above-described specific embodiments, and various modifications and variations can be made by those skilled in the art without departing from the gist of the appended claims. Thus, it is intended that the modifications and variations should not be understood independently of the technical sprit or prospect of the disclosure.

In addition, the disclosure describes both a device invention and a method invention, and descriptions of both the inventions may be complementarily applied as needed.

What is claimed is:

1. A mobile device comprising:
 a storage unit configure to store an image;
 a display unit configured to display the image;
 a sensor unit configured to detect a touch input to the display unit; and
 a controller configured to display the image in a navigation mode to display a plurality of thumbnail images or in a window mode to display at least one image selected from the plurality of thumbnail images, wherein the controller is further configured to:

capture a first image from a first source, capture a second image having an upper and lower position relationship or a left and right position relationship to the first image from the first source, capture a third image from a second source, if the controller displays the first image of the first source in the window mode and detects a first gesture in a first direction, switch from the first image of the first source to the third image of the second source and display the third image of the second source, and if the controller displays the first image of the first source in the window mode and detects a second gesture in a second direction, switch from the first image of the first source to the second image of the first source and display the second image of the first source, wherein if the first image and the second image of the first source are in the left and right position relationship, the first direction and the second direction are the same direction, and the first gesture and the second gesture are decided based on a threshold speed.

2. The mobile device according to claim 1, wherein the first source and the second source comprise visual information and are identified by each source address information thereof.

3. The mobile device according to claim 2, wherein the upper and lower position relationship is a relationship among images located in a single source identified by the source address information and the relationship among images displayed in the source through vertical scroll, and the left and right position relationship is a relationship among images located in a single source identified by the source address information and the relationship among images displayed in the source through horizontal scroll.

4. The mobile device according to claim 1, wherein if the first image and the second image of the first source are in the upper and lower position relationship, the first gesture in the first direction is a horizontal slide gesture and the second gesture in the second direction is a vertical slide gesture.

5. The mobile device according to claim 1, wherein the image comprises source information, the source information corresponding to a source of the image.

6. The mobile device according to claim 5, wherein the source information comprises source address information corresponding to the source of the image and position information of the image in the source.

7. The mobile device according to claim 6, wherein if the controller displays the first image, the controller is further configured to display a source indicator for the first image, and wherein the source indicator is linked to the source address information of the first source from which the first image has been captured.

8. The mobile device according to claim 7, wherein if the controller detects an input for the source indicator, the controller is further configured to display the first source based on the source address information for the first image.

9. The mobile device according to claim 8, wherein if the controller displays the first source, the controller is further configured to display a position of the first image in the first source.

10. The mobile device according to claim 1, wherein the first image is an image having priority over images captured from the first source.

11. The mobile device according to claim 1, wherein the first image is an image captured at an uppermost position or a leftmost position of the first source among images captured from the first source.

12. The mobile device according to claim 1, wherein the controller is further configured to detect an overlap area between the first image and the second image.

13. The mobile device according to claim 12, wherein if the controller switches from the first image of the first source to the second image of the first source and the overlap area is present, the controller is further configured to indicate the overlap area on the second image and display the second image and the overlap area.

14. The mobile device according to claim 12, wherein if the controller switches from the first image of the first source to the second image of the first source and the overlap area is present, the controller is further configured to display only an area of the second image which does not overlap the first image.

15. The mobile device according to claim 12, wherein if the controller displays the first image and the overlap area is present, the controller is further configured to simultaneously display the first image and the second image, excluding the overlap area, and wherein the displayed area is moved by scroll.

16. The mobile device according to claim 1, wherein if the controller displays the first image or the second image of the first source, the controller is further configured to display a first indicator, and wherein the first indicator guides the first gesture in the first direction to switch from the first image or the second image to the third image of the second source.

17. The mobile device according to claim 1, wherein if the controller displays the first image, the controller is further configured to display a second indicator, and wherein the second indicator guides the second gesture in the second direction to switch the first image of the first source to the second image of the first source.

18. The mobile device according to claim 1, wherein if the controller displays the second image of the first source and the second image is a last image of the first source, the controller is further configured to display a last image indicator.

19. A control method of a mobile device, the method comprising:

capturing a first image from a first source;

capturing a second image having an upper and lower position relationship or a left and right position relationship to the first image from the first source;

capturing a third image from a second source;

deciding whether to display an image in a navigation mode to display a plurality of thumbnail images or in a window mode to display at least one image selected from among the plurality of thumbnail images; and when the controller displays the first image of the first source in the window mode, switching from the first image to another image and displaying the switched image through detection of a gesture, the switching comprising if a first gesture in a first direction is detected, switching from the first image of the first source to the third image of the second source and displaying the third image of the second source, and if a second gesture in a second direction is detected, switching from the first image of the first source to the second image of the first source and displaying the second image of the first source, wherein if the first image and the second image of the first source are in the left and right position relationship, the first direction and the second direction are the same direction, and the first gesture and the second gesture are decided based on a threshold speed.

* * * * *